(12) United States Patent
Lu

(10) Patent No.: US 9,209,167 B2
(45) Date of Patent: Dec. 8, 2015

(54) DETERMINING THRESHOLD VOLTAGE VARIATIONS IN FIELD EFFECT TRANSISTORS

(71) Applicant: International Business Machines Corporation, Armonk, NY (US)

(72) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/224,172

(22) Filed: Mar. 25, 2014

(65) Prior Publication Data

US 2015/0279831 A1 Oct. 1, 2015

(51) Int. Cl.
*G06F 17/50* (2006.01)
*H01L 27/02* (2006.01)
*H01L 27/085* (2006.01)

(52) U.S. Cl.
CPC ........ *H01L 27/0207* (2013.01); *G06F 17/5068* (2013.01); *H01L 27/085* (2013.01)

(58) Field of Classification Search
USPC .......................................... 716/110, 111, 122
See application file for complete search history.

(56) References Cited

U.S. PATENT DOCUMENTS

| 6,147,914 | A * | 11/2000 | Leung et al. ............. 365/189.09 |
| 6,304,998 | B1 | 10/2001 | Kamiya et al. |
| 6,509,595 | B1 * | 1/2003 | Leung et al. ................. 257/296 |
| 7,353,473 | B2 | 4/2008 | Pino et al. |
| 7,848,907 | B2 | 12/2010 | Lu |
| 7,895,550 | B2 | 2/2011 | Walker et al. |
| 8,547,131 | B2 | 10/2013 | Wang et al. |
| 2008/0294410 | A1 * | 11/2008 | Agarwal et al. ................. 703/14 |
| 2009/0030663 | A1 * | 1/2009 | Lu ..................... 703/4 |
| 2010/0253382 | A1 * | 10/2010 | Wang et al. ................... 324/771 |
| 2013/0320340 | A1 | 12/2013 | Acar et al. |

OTHER PUBLICATIONS

Nigel Drego "Lack of Spatial Correlation in MOSFET Threshold Voltage Variation and Implications for Voltage Scaling" 0894-6507/$25.00 2009 IEEE.*
J. Watts et al., "Modeling Small MOSFETs Using Ensemble Devices", Nanotech 2006, ISBN 0-9767985-8-1,vol. 3, pp. 703-707.

(Continued)

*Primary Examiner* — Brian Ngo
(74) *Attorney, Agent, or Firm* — Gibb & Riley, LLC; Anthony J. Canale

(57) ABSTRACT

Disclosed are a method and a system for determining threshold voltage (Vt) variations in field effect transistors (FETs), wherein multiple field effect transistors (FETs) (e.g., at least a first FET and a second FET), which are similar in design except for having different effective channel widths, can be selected for processing. Information regarding these multiple FETs (e.g., the ratio of the different effective channel widths and other information) can be acquired and used to define the relation between a standard deviation of an uncorrelated Vt variation and a difference between a first average Vt associated with the first FET and a second average Vt associated with the second FET. The relation can, depending upon the FET layouts, be used for different purposes (e.g., for characterizing the threshold voltage mismatch between a pair of adjacent essentially identical FETs on a chip or for characterizing a width scaling relation).

20 Claims, 9 Drawing Sheets

(56) References Cited

OTHER PUBLICATIONS

J. Watts et al., "Modeling FET Variation Within a Chip as a Function of Circuit Design and Layout Choices", Nanotech 2005, ISBN 0-9767985-3-0, pp. 87-92.

Drego et al., "Lack of Spatial Correlation in MOSFET Threshold Voltage Variation and Implications for Voltage Scaling", IEEE Transactions on Semiconductor Manufacturing, vol. 22, No. 2, May 2009, pp. 245-255.

* cited by examiner

DETERMINING THRESHOLD VOLTAGE VARIATIONS IN FIELD EFFECT TRANSISTORS

BACKGROUND

The method and system disclosed herein relate to determining threshold voltage variations in field effect transistors (FETs).

As FETs continue to be scaled in size, the impact of random threshold voltage variation on FET performance increases and the ability to measure such random threshold voltage variation becomes more difficult. For example, the total random threshold voltage variation between a pair of adjacent FETs, which are identical in layout (e.g., same channel length and same channel width), will be equal to the sum of both a correlated random threshold voltage variation and an uncorrelated random threshold voltage variation. The correlated random threshold voltage variation (also referred to herein as a systematic random threshold voltage variation) refers to a variation wherein the variation direction away from a nominal threshold voltage value will be the same for both of the FETs in the pair. For example, the gate dielectric thickness may vary from chip to chip such that the threshold voltages of the FETs in the pair may both be greater than or less than the nominal threshold voltage value. An uncorrelated random threshold voltage variation refers to a variation wherein the variation direction away from the nominal threshold voltage value can be the same or different (i.e., entirely random) for the FETs in the pair. For example, random dopant fluctuations (RDFs) may occur across a chip such that the threshold voltage of either of the FETs in the pair may be greater than or less than the nominal threshold voltage value. Thus, the correlated random variation does not contribute to the threshold voltage mismatch between the FETs in the pair, but the uncorrelated variation does. Since threshold voltage matching between FETs is critical in many circuits (e.g., static random access memory (SRAM) circuits, dynamic random access memory (DRAM) circuit, etc.), it is important during testing to properly determine not only the uncorrelated threshold voltage variation that leads to threshold voltage mismatch, but also the correlated threshold voltage variation that does not. However, current testing techniques do not account for the correlated threshold voltage variation and, thereby have limited accuracy. Similarly, techniques are also known for determining a difference between the average threshold voltages of two FETs, which differ in layout only with respect to their channel widths, in order to characterize the width scaling relation (i.e., to determine changes in threshold voltage as a function of channel width). However, such techniques do not account for any contribution from uncorrelated random threshold voltage variations and, thereby also have limited accuracy.

SUMMARY

In view of the foregoing, disclosed herein is a computer-implemented method for determining threshold voltage variations in field effect transistors (FETs). In the method, multiple field effect transistors (FETs) (e.g., at least a first FET and a second FET), which are similar in design except for having different effective channel widths, can be selected for processing. Information regarding these multiple FETs (e.g., the ratio of the different effective channel widths and other information) can be acquired and used to define the relation between a standard deviation of an uncorrelated threshold voltage variation associated with the multiple FETs and a difference between a first average threshold voltage associated with the first FET and a second average threshold voltage associated with the second FET. This defined relation can, depending upon the layouts of the multiple FETs, be used for different purposes (e.g., for characterizing the threshold voltage mismatch between a pair of adjacent essentially identical FETs on a chip or for characterizing a width scaling relation). Also disclosed herein are an associated computer system and a computer program product for determining threshold voltage variations in FETs.

More particularly, disclosed herein is a computer-implemented method for determining threshold voltage variations in field effect transistors (FETs). In the method, multiple field effect transistors (FETs) having different effective channel widths can be selected for processing and information regarding these multiple FETs can be acquired (e.g., from the FET design layout and FET design specifications, through simulations, through models, through measurements and calculations, etc.), stored in a memory and accessed (e.g., by a processor in communication with the memory).

Specifically, in the method, multiple FETs can be selected such that they are all similar in design except for having different effective channel widths. For example, the multiple FETs can be selected such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved, for example, either by selecting FETs with different numbers of channel regions where each channel region has the same design width or by selecting FETs with the same number of channel regions (e.g., one) with different design widths. In any case, the multiple FETs can be selected such that they comprise at least a first FET having a first effective channel width (i.e., $w_1$) and a second FET having a second effective channel width (i.e., $w_2$) that is greater than the first effective channel width $w_1$.

The information, which is acquired and stored in memory, can comprise at least a ratio of the second effective channel width $w_2$ to the first effective channel width $w_1$. This information can be accessed and used (e.g., by the processor) to define the relation between a standard deviation of an uncorrelated threshold voltage variation (i.e., $\sigma_u$) associated with the multiple FETs and a difference between a first average threshold voltage associated with the first FET and a second average threshold voltage associated with the second FET. This defined relation can, depending upon the layouts of the multiple FETs, be used for different purposes.

In one embodiment, this defined relation can be used to determine the standard deviation of the uncorrelated threshold voltage variation $\sigma_u$ associated with the multiple FETs and this standard deviation of the uncorrelated threshold voltage variation $\sigma_u$ can, in turn, be used to determine a standard deviation of a correlated threshold voltage variation (i.e., $\sigma_c$) associated with the multiple FETs. The standard deviation of the uncorrelated threshold voltage variation $\sigma_u$ can also be used to characterize the threshold voltage mismatch between a pair of adjacent essentially identical FETs on a chip.

In this case, the multiple FETs can be selected so as to be similar in design, as described above, except for having different numbers of channel regions, each with the same design width and, thereby except for having different effective channel widths. Specifically, in this case, the multiple FETs can be selected such that the first FET has a first effective channel width $w_1$ and the second FET has a second effective channel width $w_2$ that is greater than the first effective channel width $w_1$ and further such that the first FET comprises a first number $N_1$ of channel region(s), each having a specific channel width, and the second FET comprises a second number $N_2$ of channel regions, each having the same specific channel width. The first number $N_1$ of channel region(s) in the first FET is different from and, particularly, less than the second number $N_2$ of channel regions in the second FET. For example, the first number $N_1$ of channel region(s) in the first FET can be one and the second number $N_2$ of channel regions in the second FET can be a positive integer that is greater than one.

The information, which is acquired and stored in memory, can comprise the ratio of the second effective channel width $w_2$ to the first effective channel width $w_1$ and can further comprise the first average threshold voltage and the second average threshold voltage, where the first average threshold voltage was calculated from first threshold voltage measurements taken, during testing, from first field effect transistors on multiple test chips and where the second average threshold voltage was calculated from second threshold voltage measurements taken, during the testing, from second field effect transistors on the multiple test chips. This information can also further comprise two different types of first-moment values (e.g., a median value and a mean value or a mode value) of an additional electrical property (e.g., leakage current (i.e., $I_{off}$)) of either the first FET and/or the second FET, as calculated based on leakage current measurements taken, during the testing, from the first field effect transistors and/or the second field effect transistors.

With the multiple FETs configured in this manner and with the information acquired, as described above, the process of defining the relation can comprise determining the standard deviation of the uncorrelated threshold voltage variation $\sigma_u$ based on a sub-threshold slope value (i.e., S), the difference between the first average threshold voltage and the second average threshold voltage, and the ratio of the second effective channel width $w_2$ to the first effective channel width $w_1$ (i.e., $w_2/w_1 = N_2/N_1$). Additionally, the method can comprise determining, by the processor, both a standard deviation of a total threshold voltage variation (i.e., $\sigma_T$) associated with the multiple FETs, based on the two different types of first-moment values of the additional electrical property, and the standard deviation of the correlated threshold voltage variation $\sigma_c$ associated with the multiple FETs, based on the total threshold voltage variation $\sigma_T$ and the standard deviation of the uncorrelated threshold voltage variation $\sigma_u$. The method can also comprise using, by the processor, the standard deviation of the uncorrelated threshold voltage variation $\sigma_u$ to characterize the threshold voltage mismatch between a pair of adjacent essentially identical FETs on a chip.

In another embodiment, this defined relation may be used to characterize a width scaling relation associated with the multiple FETs.

In this case, the multiple FETs can be selected so as to be similar in design, as described above, except for having the numbers of channel regions with different design widths and, thereby except for having different effective channel widths. Specifically, in this case, the multiple FETs can be selected such that the first FET has a first effective channel width $w_1$, the second FET has a second effective channel width $w_2$ that is greater than the first effective channel width $w_1$ and so on and further such that the multiple FETs have the same number of channel region(s) with the same channel lengths.

The information, which is acquired and stored in memory, can comprise the ratio of the second effective channel width $w_2$ to the first effective channel width $w_1$ and can further comprise the first average threshold voltage and the second average threshold voltage, where the first average threshold voltage was calculated from first threshold voltage measurements taken, during testing, from first field effect transistors on multiple test chips and where the second average threshold voltage was calculated from second threshold voltage measurements taken, during the testing, from second field effect transistors on the multiple test chips.

With the multiple FETs configured in this manner and with the information acquired, as described above, the process of defining the relation can comprise determining the standard deviation of the uncorrelated threshold voltage variation $\sigma_u$ based on a sub-threshold slope value (i.e., S), the difference between the first average threshold voltage and the second average threshold voltage, and the ratio of the second effective channel width $w_2$ to the first effective channel width $w_1$. This relation can subsequently be used to characterize a width scaling relation between the multiple FETs.

Also disclosed herein is an associated computer system for determining threshold voltage variations in field effect transistors (FETs). The computer system can comprise a memory and a processor in communication with the memory. The memory can store information associated with multiple field effect transistors (FETs), which are selected for processing and which have different effective channel widths. This information can be acquired, for example, from the FET design layout and design specifications, through simulations, through models, through measurements and calculations, etc.

The multiple FETs can be selected such that they are all be similar in design except for their different effective channel widths. For example, the multiple FETs can be selected such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved either by selecting FETs with different numbers of channel regions where each channel region has the same design width or by selecting FETs with the same number of channel regions (e.g., one) with different design widths. In any case, the multiple FETs can comprise at least a first FET having a first effective channel width (i.e., $w_1$) and a second FET having a second effective channel width (i.e., $w_2$) that is greater than the first effective channel width $w_1$. The information, which is acquired and stored in memory, can comprise at least a ratio of the second effective channel width $w_2$ to the first effective channel width $w_1$. The processor can access the information and, based on this information, can define the relation between a standard deviation of an uncorrelated threshold voltage variation (i.e., $\sigma_u$) associated with the multiple FETs and a difference between a first average threshold voltage associated with the first FET and a second average threshold voltage associated with the second FET. This defined relation can, depending upon the layouts of the multiple FETs, be used for different purposes.

In one embodiment, this defined relation can be used to determine the standard deviation of the uncorrelated threshold voltage variation $\sigma_u$ associated with the multiple FETs and this uncorrelated threshold voltage variation $\sigma_u$ can, in turn, be used to determine a standard deviation of a correlated threshold voltage variation (i.e., $\sigma_c$) associated with the multiple FETs. The standard deviation of the uncorrelated threshold voltage variation $\sigma_u$ can also be used to characterize the threshold voltage mismatch between a pair of adjacent essentially identical FETs on a chip.

In this case, the multiple FETs can be selected so as to be similar in design, as described above, except for having different numbers of channel regions, each with the same design width and, thereby except for having different effective channel widths. Specifically, in this case, the multiple FETs can be selected such that the first FET has a first effective channel width $w_1$ and the second FET has a second effective channel width $w_2$ that is greater than the first effective channel width $w_1$ and further such that the first FET comprises a first number $N_1$ of channel region(s), each having a specific channel width, and the second FET comprises a second number $N_2$ of channel regions, each having the same specific channel width. The first number $N_1$ of channel region(s) in the first FET is different from and, particularly, less than the second number $N_2$ of channel regions in the second FET. For example, the first number $N_1$ of channel region(s) in the first FET can be one and the second number $N_2$ of channel regions in the second FET can be a positive integer that is greater than one.

The information, which is acquired and stored in memory, can comprise the ratio of the second effective channel width $w_2$ to the first effective channel width $w_1$ and can further comprise the first average threshold voltage and the second average threshold voltage, where the first average threshold voltage was calculated from first threshold voltage measurements taken, during testing, from first field effect transistors on multiple test chips and where the second average threshold voltage was calculated from second threshold voltage measurements taken, during the testing, from second field effect transistors on the multiple test chips. This information can also further comprise two different types of first-moment values (e.g., a median value and a mean value or a mode value) of an additional electrical property (e.g., leakage current (i.e., $I_{off}$)) of either the first FET and/or the second FET, as calculated based on leakage current measurements taken, during the testing, from the first field effect transistors and/or the second field effect transistors.

With the multiple FETs configured in this manner and with the information acquired, as described above, the processor can define the relation by determining the standard deviation of the uncorrelated threshold voltage variation $\sigma_u$ based on a sub-threshold slope value (i.e., S), the difference between the first average threshold voltage and the second average threshold voltage and the ratio of the second effective channel width $w_2$ to the first effective channel width $w_1$ (i.e., $w_2/w_1 = N_2/N_1$). Additionally, the processor can determine both a standard deviation of a total threshold voltage variation (i.e., $\sigma_T$) associated with the multiple FETs, based on the two different types of first-moment values of the additional electrical property, and the standard deviation of the correlated threshold voltage variation $\sigma_c$ associated with the multiple FETs, based on the total threshold voltage variation $\sigma_T$ and the standard deviation of the uncorrelated threshold voltage variation $\sigma_u$. The processor can also use the standard deviation of the uncorrelated threshold voltage variation $\sigma_u$ to characterize the threshold voltage mismatch between a pair of adjacent essentially identical FETs on a chip.

In another embodiment, this defined relation may be used to characterize a width scaling relation associated with the multiple FETs.

In this case, the multiple FETs can be selected so as to be similar in design, as described above, except for having the same number of channel regions (e.g., one each) with different design widths and, thereby except for having different effective channel widths. Specifically, in this case, the multiple FETs can be selected the multiple FETs can be selected such that the first FET has a first effective channel width $w_1$, the second FET has a second effective channel width $w_2$ that is greater than the first effective channel width $w_1$ and so on and further such that the multiple FETs have the same number of channel region(s) with the same channel lengths.

The information, which is acquired and stored in memory, can comprise the ratio of the second effective channel width $w_2$ to the first effective channel width $w_1$ and can further comprise the first average threshold voltage and the second average threshold voltage, where the first average threshold voltage was calculated from first threshold voltage measurements taken, during testing, from first field effect transistors on multiple test chips and where the second average threshold voltage was calculated from second threshold voltage measurements taken, during the testing, from second field effect transistors on the multiple test chips.

With the multiple FETs configured in this manner and with the information acquired, as described above, the processor can define the relation by determining the standard deviation of the uncorrelated threshold voltage variation $\sigma_u$ based on a sub-threshold slope value (i.e., S), the difference between the first average threshold voltage and the second average threshold voltage and the ratio of the second effective channel width $w_2$ to the first effective channel width $w_1$. This relation can subsequently be used to characterize a width scaling relation between the multiple FETs.

Also disclosed herein is a computer program product. The computer program product can comprise a computer readable storage medium having program instructions embodied therewith (i.e., stored thereon), which can be executed by a processor to cause the processor to perform the above-described method.

BRIEF DESCRIPTION OF THE SEVERAL VIEWS OF THE DRAWINGS

The embodiments herein will be better understood from the following detailed description with reference to the drawings, which are not necessarily drawn to scale and in which.

DETAILED DESCRIPTION

Figure 1:
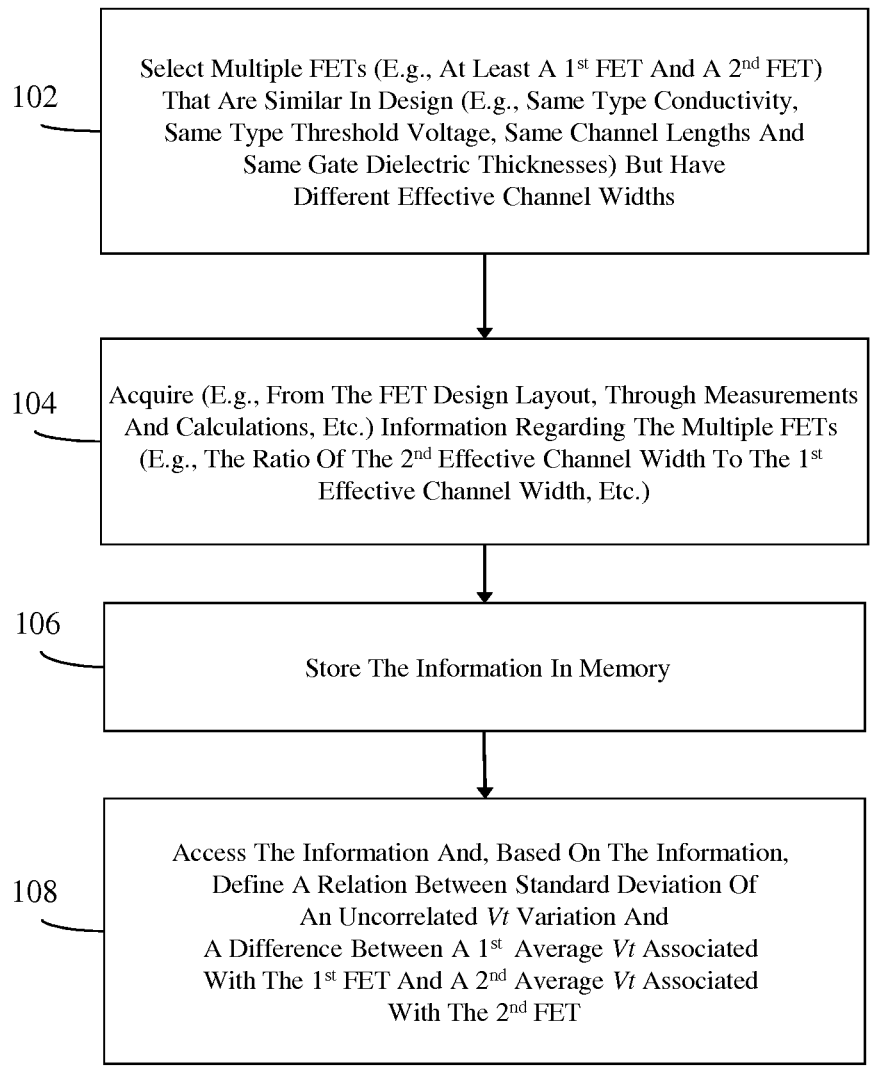
FIG. 1 is a flow diagram illustrating a method for determining threshold voltage variations in field effect transistors (FETs)

As mentioned above, as field effect transistors (FETs) continue to be scaled in size, the impact of random threshold voltage variation on FET performance increases and the ability to measure such random threshold voltage variation becomes more difficult. For example, the total random threshold voltage variation between a pair of adjacent FETs, which are identical in layout (e.g., same channel length and same channel width), will be equal to the sum of both a correlated random threshold voltage variation and an uncorrelated random threshold voltage variation. The correlated random threshold voltage variation (also referred to herein as a systematic random threshold voltage variation) refers to a variation wherein the variation direction away from a nominal threshold voltage value will be the same for both of the FETs in the pair. For example, the gate dielectric thickness may vary from chip to chip such that the threshold voltages of the FETs in the pair may both be greater than or less than the nominal threshold voltage value. An uncorrelated random threshold voltage variation refers to a variation wherein the variation direction away from the nominal threshold voltage value can be the same or different (i.e., entirely random) for the FETs in the pair. For example, random dopant fluctuations (RDFs) may occur across a chip such that the threshold voltage of either of the FETs in the pair may be greater than or less than the nominal threshold voltage value. Thus, the correlated random variation does not contribute to the threshold voltage mismatch between the FETs in the pair, but the uncorrelated variation does. Since threshold voltage matching between FETs is critical in many circuits (e.g., static random access memory (SRAM) circuits, dynamic random access memory (DRAM) circuit, etc.), it is important during testing to properly determine not only the uncorrelated threshold voltage variation that leads to threshold voltage mismatch, but also the correlated threshold voltage variation that does not. However, current testing techniques do not account for the correlated threshold voltage variation and, thereby have limited accuracy. Similarly, techniques are also known for determining a difference between average threshold voltages between two FETs, which differ in layout only with respect to their channel widths, in order to characterize the width scaling relation (i.e., to determine changes in threshold voltage as a function of channel width). However, such techniques do not account for any contribution from uncorrelated random threshold voltage variations and, thereby also have limited accuracy.

In view of the foregoing, disclosed herein is a computer-implemented method for determining threshold voltage variations in field effect transistors (FETs). In the method, multiple field effect transistors (FETs) (e.g., at least a first FET and a second FET), which are similar in design except for having different effective channel widths, can be selected for processing. Information regarding these multiple FETs (e.g., the ratio of the different effective channel widths and other information) can be acquired and used to define the relation between a standard deviation of an uncorrelated threshold voltage variation associated with the multiple FETs and a difference between a first average threshold voltage associated with the first FET and a second average threshold voltage associated with the second FET. This defined relation can, depending upon the layouts of the multiple FETs, be used for different purposes (e.g., for characterizing the threshold voltage mismatch between a pair of adjacent essentially identical FETs on a chip or for characterizing a width scaling relation). Also disclosed herein are an associated computer system and a computer program product for determining threshold voltage variations in FETs.

More particularly, referring to the flow diagram of FIG. 1, disclosed herein is a computer-implemented method for determining threshold voltage variations in field effect transistors (FETs). This method can be implemented, for example, in a computer hardware environment such as that described in detail below and depicted in FIG. 9.

In the method, multiple field effect transistors (FETs) having different effective channel widths can be selected (e.g., by a user) for processing (102). Specifically, the multiple FETs can be selected at process 102 such that they are all similar in design except for having different effective channel widths. For example, the multiple FETs can be selected at process 102 such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved, for example, either by selecting FETs with different numbers of channel regions where each channel region has the same design width or by selecting FETs with the same number of channel regions (e.g., one) with different design widths. In any case, the multiple FETs selected at process 102 can comprise at least a first FET and a second FET. The first FET can have a first effective channel width $w_1$ and the second FET can have a second effective channel width $w_2$ that is greater than the first effective channel width $w_1$. Additional FETs having additional effective channel widths that are different from the first effective channel width $w_1$ and the second effective channel width $w_2$ can also be selected for processing. Specific requirements for selecting the multiple FETs will be discussed in greater detail below with regard to the specific embodiments.

Information regarding these multiple FETs can be acquired (e.g., from the FET design layout and design specifications, through measurements and calculations, through simulations, from models, etc.) (104) and stored in a memory (106). The information can comprise at least a ratio of the second effective channel width $w_2$ of the second FET to the first effective channel width $w_1$ of the first FET (i.e., $w_2/w_1$). The information can be accessed and used (e.g., by the processor) to define a relation between a standard deviation of an uncorrelated threshold voltage variation (i.e., $\sigma_u$) associated with the multiple FETs and a difference between a first average threshold voltage (i.e., $\langle V_{th,1} \rangle$) associated with the first FET and a second average threshold voltage (i.e., $\langle V_{th,2} \rangle$) associated with the second FET (108). Depending upon the types of FETs selected at process 102, the relation defined at process 108 can be used for different purposes.

It should be noted that, when the multiple FETs selected at process 102 are planar FETs, the relationship between the first effective channel width $w_1$ and the second effective channel width $w_2$ and the corresponding design widths for each channel region in the first FET and second FET can be defined using the following expressions:

$$w_1 = W_{design,1} + dw, w_2 = N_{f,2}(W_{design,2} + dw), \quad (1)$$

where the number of channel regions (i.e., the number of gate fingers) in the first FET is $N_1=1$, where the number of channel regions (i.e., the number of gate fingers) in the second FET is $N_2=N_{f,2}$, where $W_{design,1}$ and $W_{design,2}$ are the single-channel region design width of the first FET and the second FET, respectively, and the width bias dw is either a fixed constant or is a weak function of FET's design width. Those skilled in the art will recognize that the there is often a small difference between a design width (in layout) and a corresponding effective width for drain current. The drain current is proportional to the effective FET width for drain current, but not proportional to FET's design width. As will be discussed in greater detail below, in one embodiment the FET selection process 102 can be performed such that $W_{design,1}$ is equal to $W_{design,2}$ and $N_{f,2}$ is greater than or equal to 2. In another embodiment the FET selection process 102 can be performed such that $W_{design,2}$ is greater than $W_{design,1}$ and $N_{f,2}$ is equal to 1. In yet another embodiment the FET selection process 102 can be performed such that $W_{design,2}$ can be greater than $W_{design,1}$ when $N_{f,2}$ is greater than or equal to 2.

Alternatively, when the multiple FETs selected at process 102 are finFETs, the relationship between the first effective channel width $w_1$ and the second effective channel width $w_2$ and the corresponding numbers of gate fingers and the corresponding number of fins in each gate can be defined as follows:

$$w_1 = W_{1fin}, w_2 = N_{f,2}N_{fin,2}W_{1fin}, \quad (2)$$

where, for the first FET, there is only one gate and only one fin in that gate (i.e., there is a total of one channel region, $N_1=1$) and $W_{1fin}$ is the effective channel width associated with one fin and where, for the second FET, $N_{f,2}$ is the number of gates and $N_{fin,2}$ is the number of semiconductor fins per gate (i.e., the total $N_2=N_{f,2}N_{fin,2}$ channel regions).

In any case, in the MOSFETs selected at process 102 (i.e., in the planar FETs or finFETs), the following single-point (i.e., constant current) threshold voltage ($V_{th}$) definition can be used:

$$I_{tot}(V_{gs}=V_{th})=I_{threshold}=i_0 w/L \quad (3)$$

where $V_{th}$ is the gate bias $V_{gs}$ value when total drain current is equal to a fixed threshold value and where, for example, $i_0=300$ nA for NFETs and $i_0=70$ nA for PFETs. Here, w is the total FET width in an ensemble FET and L is the FET's channel length. Below and around the threshold voltage, the MOSFET's drain current increases with increasing gate bias $V_{gs}$ exponentially. From one chip to the next chip, there are variations for a same FET design. Due to random doping fluctuations (RDFs), there are variations in both number and positions of active doped atoms within the channel of each FET finger, leading to uncorrelated random variation for each finger's threshold voltage. For each FET layout, one measures the single-point threshold voltage over many chips, and then finds an average value of the single-point threshold voltage.

For the ith chip, the total drain current of an ensemble FET around threshold voltage is the sum of all drain currents in each individual channel region and can be expressed as follows:

$$I_{tot}^{(i)} = \sum_{j=1}^{N} I_{off,j}^{(i)} = \sum_{j=1}^{N} f(V_{ds})\exp\left(\frac{V_{gs}-V_{th,j}^{(i)}}{n_{be}v_t}\right), \quad i=1,2,3,\ldots \quad (4)$$

where N is the total number of channel regions (i.e., $N=N_f$ for a planar FET, and $N=N_f N_{fin}$ for a finFET), $v_t=k_B T/q$ is the thermal energy, $n_{be}$ is a body-effect coefficient, T is absolute temperature, $k_B$ is the Boltzmann constant and q is the magnitude of the electrical charge of an electron. Thus, the threshold voltage can be expressed as follows:

$$V_{th,j}^{(i)}=V_{th,ave}+\Delta V_{th}^{(i)}+\delta V_{th,j}^{(i)}, i=1,2,3,\ldots, j=1,2,\ldots,N, \quad (5)$$

where $V_{th,ave}$ is the average threshold voltage and $\langle V_{th,j}^{(i)} \rangle = V_{th,ave}$, where $\Delta V_{th}^{(i)}$ is the global/correlated random variation, $$\text{where } \langle \Delta V_{th}^{(i)} \rangle = 0, \langle (\Delta V_{th}^{(i)})^2 \rangle = \sigma_c^2, \quad (6)$$

where $\delta V_{th,j}^{(i)}$ is the local/uncorrelated random variation, and $$\text{where } \langle \delta V_{th,j}^{(i)} \rangle = 0, \langle (\delta V_{th,j}^{(i)})^2 \rangle = \sigma_{u1}^2. \quad (7)$$

Furthermore, the total variance of the threshold voltage can be expressed as follows:

$$\sigma_T^2(w_1) \equiv \langle (V_{th,j}^{(i)}-V_{th,ave})^2 \rangle = \sigma_c^2 + \sigma_{u1}^2. \quad (8)$$

The uncorrelated random threshold voltage variation and its relation to threshold voltage mismatch can be expressed as follows:

$$\sigma_u(w)=\sigma_{mismatch}(w)/\sqrt{2}, \quad (9)$$

and, thus, can be obtained by measuring the threshold voltage difference between two identically designed and adjacent FETs. Based on the definition (3) of the single-point threshold voltage and the drain current expression (4) of an ensemble FET, the threshold voltage of an ensemble FET on the ith chip can be expressed as follows:

$$V_{th}^{(i)} = V_{gs}^{(i)} = V_{th,ave} + \Delta V_{th}^{(i)} + n_{be}v_t \ln \frac{I_{threshold}}{f(V_{ds})\sum_{j=1}^{N}\exp\left(-\frac{\delta V_{th,j}^{(i)}}{n_{be}v_t}\right)}, \quad (10)$$

$$i=1,2,3,\ldots.$$

Using $I_{threshold}=Nf(V_{ds})$, the average threshold voltage of the ensemble FET over many lots/wafers/chips can be expressed as follows:

$$\langle V_{th} \rangle = V_{th,ave} + n_{be}v_t \ln N - n_{be}v_t \left\langle \ln \sum_{j=1}^{N}\exp\left(-\frac{\delta V_{th,j}^{(i)}}{n_{be}v_t}\right)\right\rangle. \quad (11)$$

For a FET with a single channel region, $N=1$ (and its width is $w=w_1$) and thus its average threshold voltage is $\langle V_{th,1} \rangle = V_{th,ave}$, as expected. It should be noted that the average threshold voltage of a single channel region FET ($\langle V_{th,1} \rangle$) is independent of the correlated threshold voltage variation $\Delta V_{th}^{(i)}$ and is also independent of the uncorrelated threshold voltage variation $\delta V_{th,j}^{(i)}$. As a contrast, the average threshold voltage of a multi-finger/fin FET ($\langle V_{th,2} \rangle$) is independent of the correlated threshold voltage variation $\Delta V_{th}^{(i)}$ but depends on the uncorrelated threshold voltage variations $\delta V_{th,j}^{(i)}$, $j=1,2,\ldots,N$. For an ensemble FET ($N \geq 2$), the variance (i.e., the square of the standard variation) of the single-point threshold voltage can be expressed as follows:

$$\sigma_T^2(w) \equiv \langle (V_{th} - \langle V_{th} \rangle)^2 \rangle = \sigma_c^2 + \sigma_u^2(w). \quad (12)$$

It should further be noted that the standard deviation $\sigma_u(w)$ of the uncorrelated threshold voltage variation decreases monotonically with increasing effective FET width w. The embodiments of the disclosed method discussed in detail below are beneficial in that they can be used to obtain $\sigma_{u1}$ and $\sigma_u(w)$ without using a pair of adjacent FETs. Specifically, they can be used to obtain $\sigma_{u1}$, $\sigma_c$, $\sigma_T(w_1)$ as well as $\sigma_u(w)$, $\sigma_c$, $\sigma_T(w)$ through measurements of average threshold voltage values and measurements of the average (i.e., mean), median, and mode of another electrical property, such as $I_{off}$ current.

Given the relations (1)-(12) defined above, the information acquired and stored at processes (104)-(106) can be accessed and used (e.g., by the processor) at process (108) to define the relation between a standard deviation of an uncorrelated threshold voltage variation (i.e., associated with the multiple FETs and a difference between a first average threshold voltage associated with the first FET and a second average threshold voltage associated with the second FET. This can be accomplished by calculating the standard deviation of the uncorrelated threshold voltage variation using the following expression:

$$\sigma_{u1} = \frac{s}{\ln 10}\sqrt{\ln\frac{(w_2/w_1)-1}{(w_2/w_1)\exp[2(\ln 10)(\langle V_{th,2}\rangle - \langle V_{th,1}\rangle)/S]-1}}, \quad (13)$$

where $\langle V_{th,1}\rangle$ is the average single-point threshold voltage of a first FET, $\langle V_{th,2}\rangle$ is the average single-point threshold voltage of a second FET, $\sigma_{u1}$ is the standard deviation of the uncorrelated threshold voltage variations of the first FET [$\sigma_{u1} \equiv \sigma_u(w_1)$], and S is a sub-threshold slope value. It should be noted that $\sigma_u(w)$ will decrease monotonically with increasing w. An exemplary scaling relation is that $\sigma_u(w)$ is inversely proportional to the square root of FET width w. That is, $$\sigma_u(w) = \sigma_{u1}\sqrt{\frac{w_1}{w}}. \quad (14)$$

This scaling relation is provided for illustration purposes and it should be understood that other scaling relations could apply (e.g., a different scaling relation based on hardware data).

As mentioned above, depending upon the types and layouts of the multiple FETs selected (e.g., by a user for processing) at process 102, the relation defined at process 108 can be used for different purposes.

Figure 2:
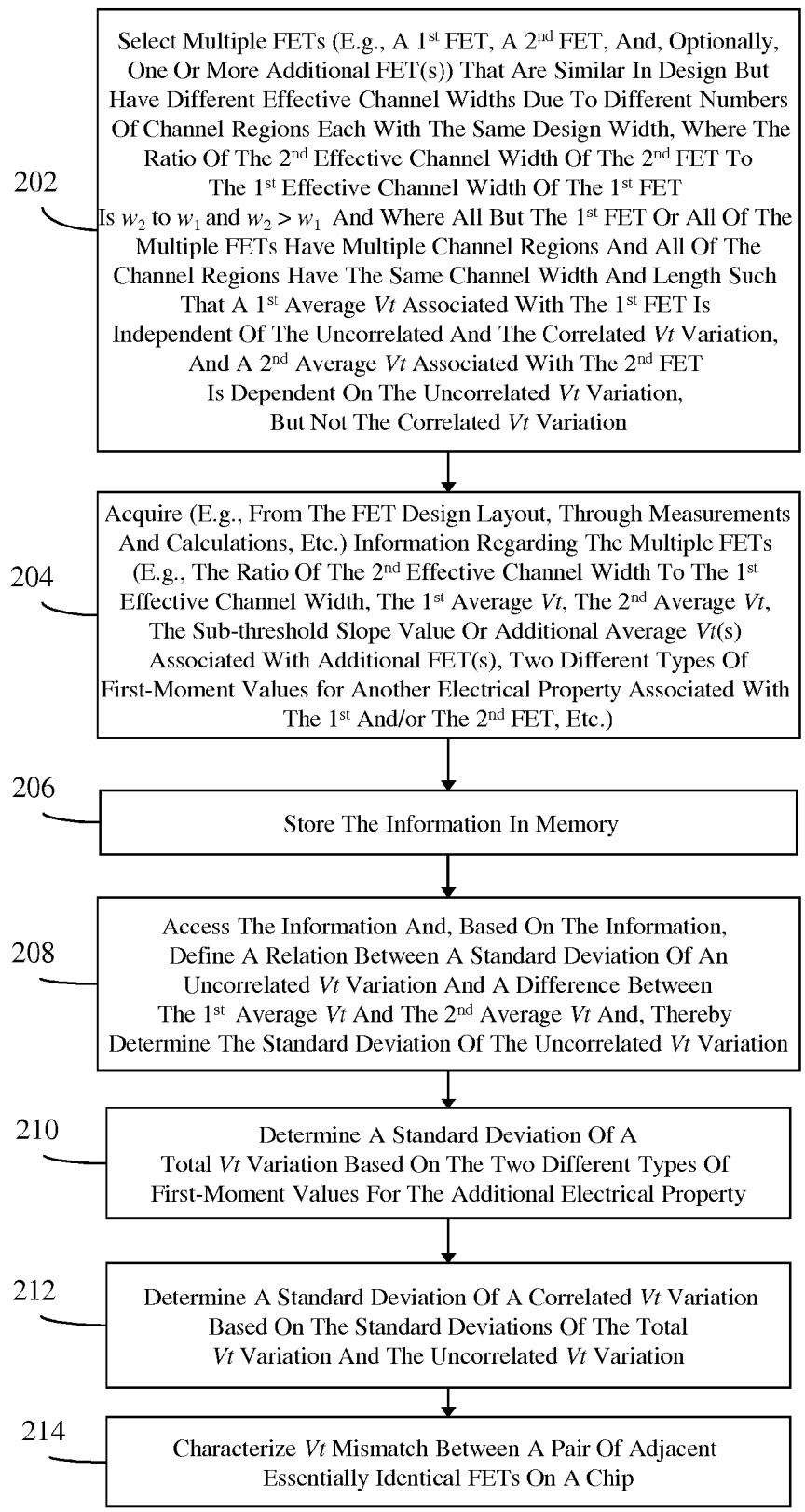
FIG. 2 is a flow diagram illustrating in greater detail one embodiment of the method of FIG. 1.

FIG. 2 is a flow diagram illustrating in greater detail one embodiment wherein the defined relation can be used to determine the standard deviation of the uncorrelated threshold voltage variation (i.e., $\sigma_u$) associated with the multiple FETs and this uncorrelated threshold voltage variation $\sigma_u$ can, in turn, be used to determine the standard deviation of a standard deviation of a correlated threshold voltage variation (i.e., $\sigma_c$) associated with the multiple FETs. The standard deviation of the uncorrelated threshold voltage variation $\sigma_u$ can also subsequently be used to characterize the threshold voltage mismatch between a pair of adjacent essentially identical FETs on a chip.

More specifically, in the embodiment illustrated in the flow diagram of FIG. 2, multiple field effect transistors (FETs) having different effective channel widths can be selected (e.g., by a user) for processing (202). The multiple FETs can be selected at process 202 such that they are all similar in design except for their different effective channel widths. For example, the multiple FETs can be selected at process 202 such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved by selecting FETs with different numbers of channel regions where each channel region has the same design width.

That is, in this case, the multiple FETs selected at process 202 can comprise at least a first FET, having a first effective channel width $w_1$, and a second FET, having a second effective channel width $w_2$ that is greater than the first effective channel width $w_1$, can be selected for processing. Ideally, the first FET and the second FET can be selected such that a first average threshold voltage ($\langle V_{th,1}\rangle$) associated with the first FET will be independent of both the standard deviation of the uncorrelated threshold voltage variation ($\sigma_u$) and the standard deviation of the correlated threshold voltage variation ($\sigma_c$) and such that a second average threshold voltage ($\langle V_{th,2}\rangle$) associated with the second FET will be dependent on the standard deviation of the uncorrelated threshold voltage variation ($\sigma_u$), but independent of the standard deviation of the correlated threshold voltage variation ($\sigma_c$). To accomplish this, the multiple FETs can be selected at process 202 such that the first FET comprises a first number $N_1$ of channel region(s) and, particularly, one channel region (i.e., $N_1$=1), having a specific channel width and a specific channel length, and such that the second FET comprises a second number $N_2$ of channel regions, each having the same specific channel width and the same specific channel length. That is, all but the first FET can comprise multi-finger FET(s) or multi-fin FET(s) having multiple channel regions with each channel region in each FET having the same specific channel width and the same specific channel length.

Figure 3A:
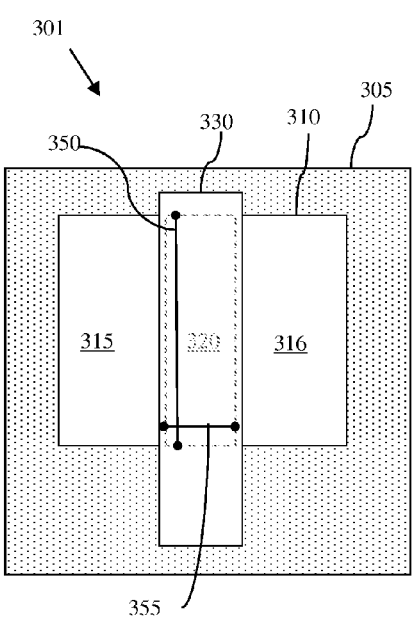
FIG. 3A is a top view diagram illustrating an exemplary single-finger FET that can be selected at process 202 of FIG. 2.
Figure 3B:
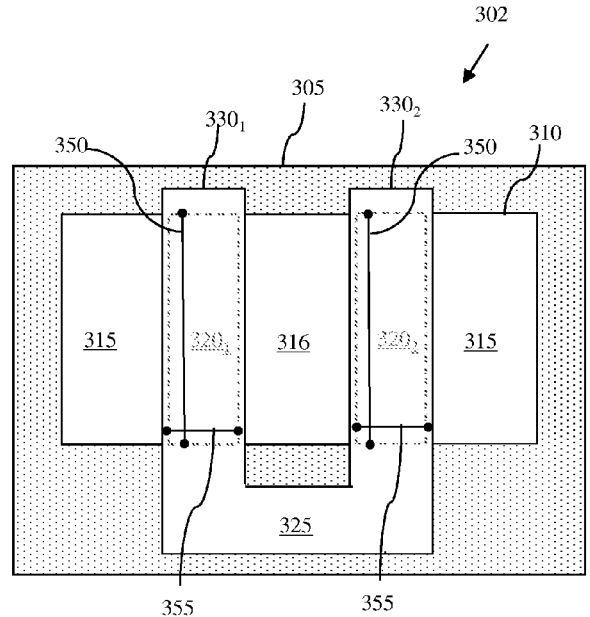
FIG. 3B is a top view diagram illustrating an exemplary multi-finger FET that can be selected at process 202 of FIG. 2.
Figure 3C:
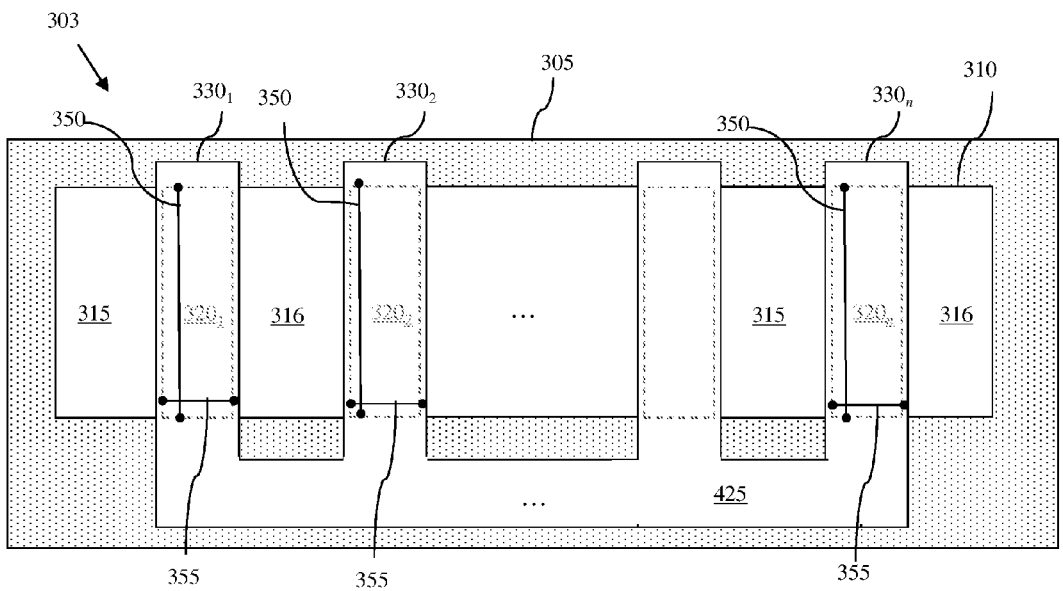
FIG. 3C is a top view diagram illustrating another exemplary multi-finger FET that can be selected at process 202 of FIG. 2.
Figure 4A:
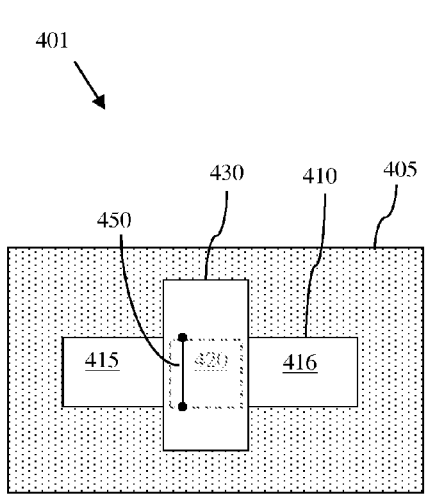
FIG. 4A is a top view diagram illustrating an exemplary single-fin FET that can be selected at process 202 of FIG. 2.
Figure 4B:
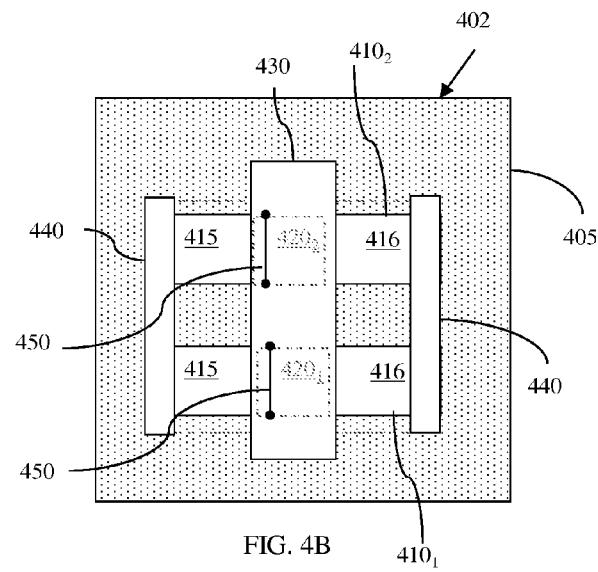
FIG. 4B is a top view diagram illustrating an exemplary multi-fin FET that can be selected at process 202 of FIG. 2.
Figure 4C:
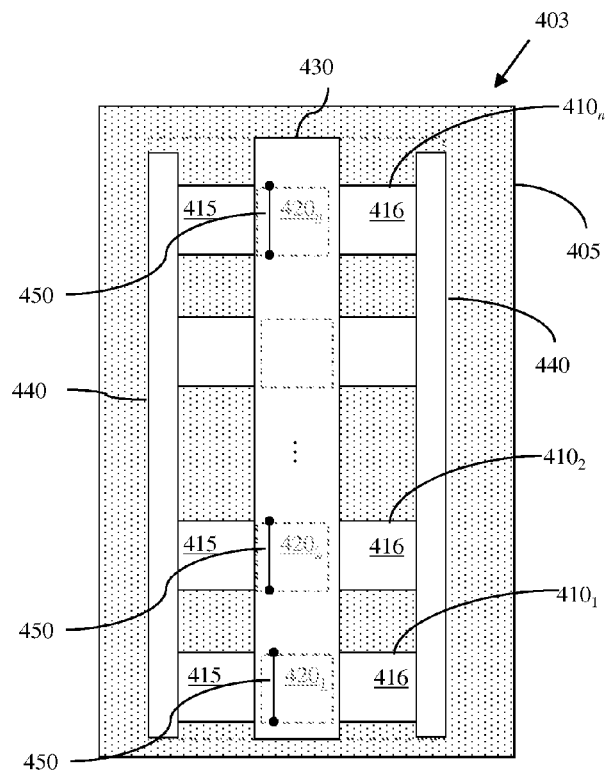
FIG. 4C is a top view diagram illustrating another exemplary multi-fin FET that can be selected at process 202 in the method of FIG. 2.

Thus, for example, the first FET selected at process 202 can comprise a single-finger FET 301, such as that illustrated in FIG. 3A, or the single-fin FET 401, such as that illustrated in FIG. 4A, and the second FET selected at process 202 can comprise, as appropriate, a multi-finger FET 302 or 303, as illustrated in FIG. 3B or 3C, or a multi-fin FET 402 or 403, as illustrated in FIG. 4B or 4C. Any additional FET selected at process 202 can comprise the multi-finger FET 303, as illustrated in FIG. 3C, or the multi-fin FET 403, as illustrated in FIG. 4C, with a greater number of fingers or fins, as applicable, than in the second FET.

For purposes of this disclosure, a single-finger FET 301, such as that illustrated in FIG. 3A, refers to a planar FET comprising a semiconductor body 310 defined, for example, by a trench isolation region 305 in a semiconductor layer. This semiconductor body 310 can comprise a single channel region 320 positioned between a source region 315 and a drain region 316. A single gate structure 330 (also referred to herein as a single gate finger) can traverse the single channel region 320. A multi-finger FETs 302 or 303, such as that illustrated in FIG. 3B or 3C, respectively, refers to a planar FET also comprising a semiconductor body 310 defined, for example, by a trench isolation region 305 in a semiconductor layer. In this case, the semiconductor body 310 comprises multiple channel regions (e.g., see the two channel regions $320_1$-$320_2$ in FIG. 3B; see the n of channel regions $320_1$-$320_n$ in FIG. 3C) with each channel region positioned between corresponding source and drain regions 315-316. Multiple gate structures (also referred to herein as multiple gate fingers) (e.g., see the two gate structure $330_1$-$330_2$ in FIG. 3B; see the n gate structures $330_1$-$330_n$ in FIG. 3C) can traverse the multiple channel regions, respectively, and can be electrically connected by a gate connector 325 (also referred to herein as a gate body from which the gate fingers extend).

For purposes of this disclosure, a single-fin FET 401, such as that illustrated in FIG. 4A, refers to a non-planar FET comprising: a single semiconductor fin 410 (i.e., a relatively thin rectangular shaped or fin-shaped semiconductor body) on, for example, an isolation layer 405. This semiconductor fin 410 can comprise a channel region positioned between a source region 415 and a drain region 416. A gate structure 430 can be positioned adjacent to the top surface and opposing sidewalls of the semiconductor fin 410 at the channel region 420. Optionally, the top surface of the semiconductor fin 410 may be electrically isolated from the gate structure 430 by a dielectric cap (not shown). A multi-fin FET 402 or 403, such as that illustrated in FIG. 4B or 4C, respectively, refers to a non-planar FET comprising multiple semiconductor fins (e.g., see the two semiconductor fins $410_1$-$410_2$ in FIG. 4B; see the n semiconductor fins $410_1$-$410_n$ in FIG. 4C) on, for example, an isolation layer 405. Each semiconductor fin can comprise a channel region (e.g., see the two channel regions $420_1$-$420_2$ in FIG. 4B; see the n channel regions $420_1$-$420_n$ in FIG. 4C) positioned between corresponding source and drain regions 415-416. A single gate structure 430 can traverse the semiconductor fins such that it is adjacent to the top surface and opposing sidewalls of each fin at the channel region. Optionally, the top surface of each of the semiconductor fins may be electrically isolated from the gate structure 430 by a dielectric cap (not shown). Furthermore, conductive straps 440 (e.g., contact bars) can electrically connect the source regions 415 on one side of the gate structure 430 and the drain regions 416 on either side of the gate structure 430.

As mentioned above, the channel regions in the multiple FETs selected at process 202 shall have the same specific channel width and the same specific channel length. Thus, as illustrated in FIGS. 3A-3C the channel region 320 of the single-finger FET 301, the two channel regions $320_1$-$320_2$ of the multi-finger FET 302 and the n channel regions $320_1$-$320_n$ of the multi-finger FET 303 all have the same channel width 350 and channel length 355. Similarly, as illustrated in FIGS. 4A-4C the channel region 420 of the single-fin FET 401, the two channel regions $420_1$-$420_2$ of the multi-fin FET 402 and the n channel regions $420_1$-$420_n$ of the multi-fin FET 403 all have the same channel width 450 and channel length 455.

Information regarding the selected FETs can be acquired (204) and stored (206). The information, which is acquired at process 204 and stored in memory at process 206, can comprise the ratio of the second effective channel width $w_2$ to the first effective channel width $w_1$, where the ratio is equal to the second number $N_2$ of channel regions in the second FET to the first number $N_1$ of channel regions in the first FET. As mentioned above, the first number $N_1$ should be equal to one so that the first average threshold voltage $\langle V_{th,1} \rangle$ of the first FET is independent of both the standard deviation of the uncorrelated threshold voltage variation $\sigma_u$ and the standard deviation of the correlated threshold voltage variation $\sigma_c$, whereas the second number $N_2$ should be a positive integer that is greater than the one so that the second average threshold voltage $\langle V_{th,2} \rangle$ of the second FET will be dependent on the standard deviation of the uncorrelated threshold voltage variation $\sigma_u$, but independent of the standard deviation of the correlated threshold voltage variation $\sigma_c$.

The information, which is acquired at process 204 and stored in memory at process 206, can further comprise the first average threshold voltage $\langle V_{th,1} \rangle$ (e.g., a first mean threshold voltage) associated with the first FET and the second average threshold voltage $\langle V_{th,2} \rangle$ (e.g., a second mean threshold voltage) associated with the second FET. The first average threshold voltage $\langle V_{th,1} \rangle$ can be calculated from first threshold voltage measurements taken, during testing, from first field effect transistors on multiple test chips and, similarly, the second average threshold voltage $\langle V_{th,2} \rangle$ can calculated from second threshold voltage measurements taken, during the testing, from second field effect transistors on the multiple test chips. That is, multiple instances of the first and second field effect transistors can be formed on multiple test chips and first and second threshold voltage measurements can be taken, during testing, from the first and second field effect transistors. Then, an average (e.g., a mean) of the first threshold voltage measurements can be calculated to acquire the first average threshold voltage $\langle V_{th,1} \rangle$ associated with the first FET and an average (e.g., a mean) of the second threshold voltage measurements can be calculated to acquire the second average threshold voltage $\langle V_{th,2} \rangle$ associated with the second FET.

The information, which is acquired at process 204 and stored in memory at process 206, can further comprise two different types of first-moment values (i.e., any two of average (also referred to herein as mean), median and mode values) of an additional electrical property (e.g., leakage current (i.e., $I_{off}$), also referred to herein as off current or drain-source current (i.e., $I_{tot}$) of either the first field effect transistor and/or the second field effect transistor, as calculated based on leakage current $I_{off}$ measurements taken, during the testing, from the first field effect transistors and/or the second field effect transistors. The two different types of first-moment values can comprise, for example, a median value for the leakage current (i.e., $I_{off\text{-}median}$), which is independent of both the standard deviation of the uncorrelated threshold voltage variation $\sigma_u$ and correlated threshold voltage variation $\sigma_c$, and either a mean value for the leakage current (i.e., $I_{off\text{-}mean}$) or a mode value for the leakage current (i.e., $I_{off\text{-}mode}$), which is dependent upon the total threshold voltage variation (i.e., $\sigma_T$) and, thereby dependent upon both the standard deviation of the uncorrelated threshold voltage variation $\sigma_u$ and the standard deviation of the correlated threshold voltage variation $\sigma_c$.

With the multiple FETs configured in this manner and with the information acquired at process 204 and stored at process 206, as described above, the method can further comprise calculating the expression (13), which defines the relation between a standard deviation of an uncorrelated threshold voltage variation ($\sigma_u$) and a difference between the first average threshold voltage $\langle V_{th,1} \rangle$ associated with the first FET and the second average threshold voltage $\langle V_{th,2} \rangle$ associated with the second FET (208). Then, based on the standard deviation of the uncorrelated threshold voltage variation $\sigma_u$ and the two different first moment values for the additional electrical property, the total threshold voltage variation $\sigma_T$ can be determined (210) and, based on the total threshold voltage variation $\sigma_T$, the uncorrelated correlated threshold voltage variation $\sigma_c$ can be determined (212).

More specifically, calculating the expression (13) at process 208 can comprise determining the standard deviation of the uncorrelated threshold voltage variation $\sigma_u$ based on the sub-threshold slope value (i.e., S), on the difference between the first average threshold voltage $\langle V_{th,1} \rangle$ and the second average threshold voltage $\langle V_{th,2} \rangle$ and the ratio of the second effective channel width $w_2$ to the first effective channel width $w_1$ (i.e., $w_2/w_1 = N_2/N_1$).

It should be noted that the sub-threshold slope value S can be a calculated value based on measured leakage current values, which is part of the information acquired at process 204 and stored in memory at process 206. Those skilled in the art will recognize that the sub-threshold slope value S characterizes the magnitude of the sub-threshold current, which is the diffusion current when the gate-source voltage (i.e., $V_{gs}$)

is less than the threshold voltage, by measuring how much the difference between the gate voltage (i.e., $V_g$) and the source voltage (i.e., $V_s$) (also referred to herein as $V_{gs}$) has to be reduced for the drain current (i.e., $I_{tot}$) to drop by a factor of 10 and this value can be calculated by using the following expression using current-voltage measurements taken, during said testing, from any the first field effect transistors and/or the second field effect transistors on the multiple test chips, $$S = \left(\frac{d(\log_{10} I_{tot})}{d V_{gs}}\right)^{-1} = n_{be} v_t \ln 10 = 2.303 n_{be} v_t. \quad (15)$$

Alternatively, rather than calculating the sub-threshold slope value S based on measurements, as described above, the information, which is acquired at process 204 and stored in memory at process 206 can further comprise at least one additional average threshold voltage (i.e., $\langle V_{th,n} \rangle$) (e.g., at least one additional mean threshold voltage) associated with at least one additional FET. As mentioned above, any additional FET selected at process 202 can comprise the multi-finger FET 303, as illustrated in FIG. 3C, or the multi-fin FET 403, as illustrated in FIG. 4C, with a greater number of fingers or fins, as applicable, than in the second FET. Like the first average threshold voltage $\langle V_{th,1} \rangle$ and the second average threshold voltage $\langle V_{th,2} \rangle$, this additional average threshold voltage $\langle V_{th,n} \rangle$ can be calculated based on additional threshold voltage measurements taken, during testing, from corresponding additional FETs on the multiple test chips. With the additional average threshold voltage(s) (i.e., $\langle V_{th,n} \rangle$, n=3, 4, 5, . . . ), the following expression can be used to find both the sub-threshold slope S and the standard deviation of the uncorrelated threshold voltage variation $\sigma_{u1}$ associated with the first FET, $$\langle V_{th,n} \rangle - \langle V_{th,1} \rangle = \quad (16)$$
$$-\frac{S}{2\ln 10} \ln\left(\frac{w_n/w_1}{1 + (w_n/w_1 - 1)\exp\{-[(\ln 10)\sigma_{u1}/S]^2\}}\right),$$
$$n = 1, 2, 3, 4, 5, \ldots,$$

which defines the relation between the standard deviation of the uncorrelated threshold voltage variation $\sigma_{u1}$ and a difference between a first average threshold voltage $\langle V_{th,1} \rangle$ associated with the first FET and a second average threshold voltage $\langle V_{th,1} \rangle$ associated with the second FET. The relation (16) can be defined at process 208 by using a fitting process to simultaneously determine the sub-threshold slope value S and the standard deviation of the uncorrelated threshold voltage variation $\sigma_{u1}$ using the first average threshold voltage $\langle V_{th,1} \rangle$, the second average threshold voltage $\langle V_{th,2} \rangle$ and the additional average threshold voltages ( $\langle V_{th,n} \rangle$, n=3, 4, 5, . . . ).

It should be noted that the median value $I_{off,median}$ of leakage current $I_{off}$ distribution does not depend on any of threshold voltage variations, whereas each of average value $I_{off,ave}$ (i.e., each mean value) and mode value $I_{off,\,mode}$ of leakage current $I_{off}$ distribution depends on total threshold voltage variation $\sigma_T(w)$. Thus, the method can further comprise determining, by the processor and using the following expressions, the total threshold voltage variation $\sigma_T$ associated with the multiple FETs, based on the two different types of first-moment values of the additional electrical property (210) (i.e., the median and mode of leakage current $I_{off}$ distribution)

(210) and the standard deviation of the correlated threshold voltage variation $v_c$ associated with the multiple FETs, based on the total threshold voltage variation and the standard deviation of the uncorrelated threshold voltage variation $\sigma_u$ (212):

$$\sigma_T^2(w) = \frac{2S^2}{(\ln 10)^2} \ln \frac{I_{off,ave}(w)}{I_{off,median}(w)} = 0.3772 S^2 \ln \frac{I_{off,ave}(w)}{I_{off,median}(w)}, \text{ or} \quad (17)$$

$$\sigma_T^2(w) = \frac{S^2}{(\ln 10)^2} \ln \frac{I_{off,median}(w)}{I_{off,mode}(w)} = 0.1886 S^2 \ln \frac{I_{off,median}(w)}{I_{off,mode}(w)}, \text{ or} \quad (18)$$

$$\sigma_T^2(w) = \frac{2S^2}{3(\ln 10)^2} \ln \frac{I_{off,ave}(w)}{I_{off,mode}(w)} = 0.1257 S^2 \ln \frac{I_{off,ave}(w)}{I_{off,mode}(w)}. \quad (19)$$

Figure 5:
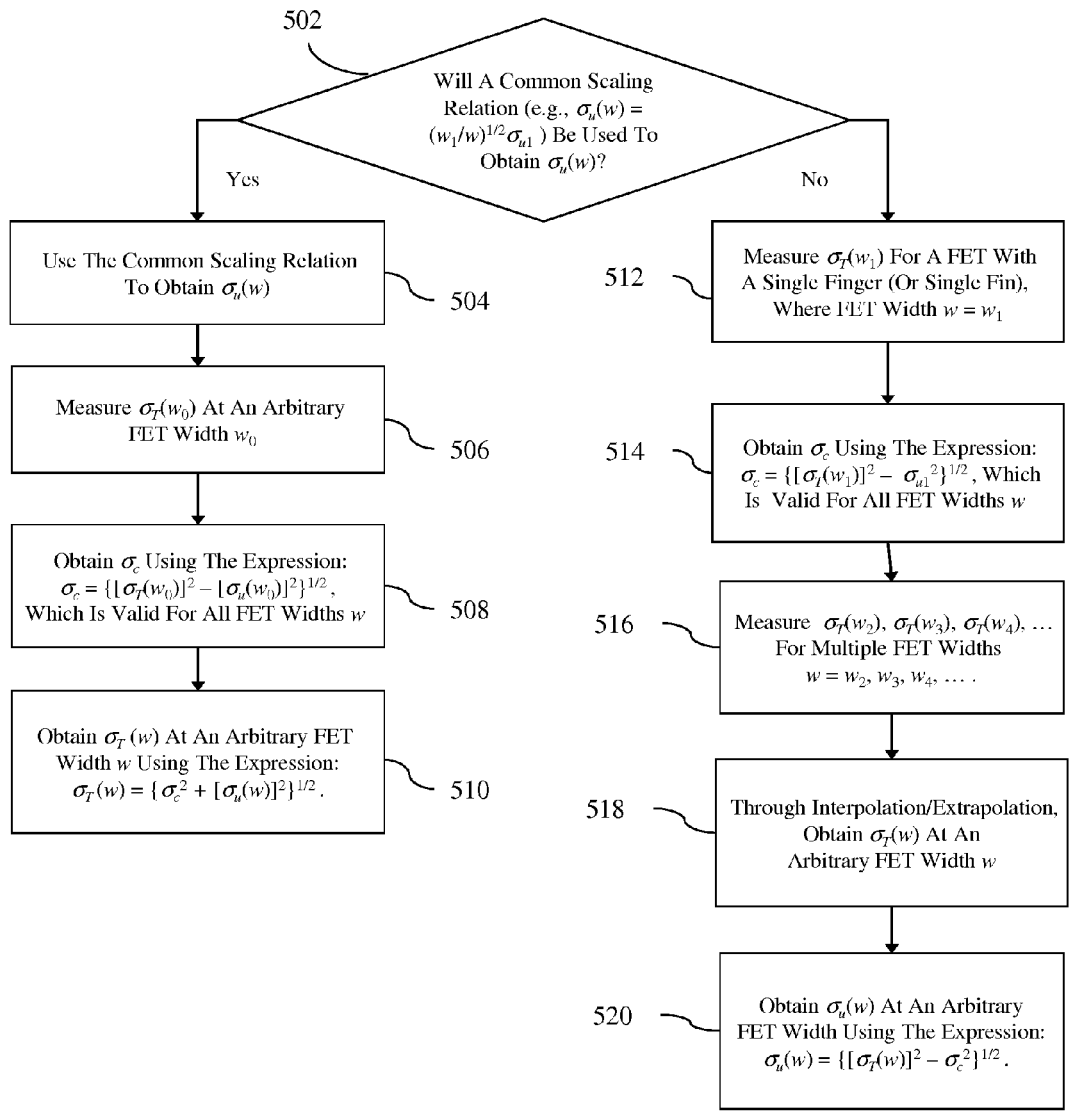
FIG. 5 is a flow diagram illustrating in greater detail techniques for finding the uncorrelated threshold voltage $\sigma_u$ and the total threshold voltage variation $\sigma_T$ at processes 208-210 of FIG. 2.

It should further be noted that the standard deviation of the correlated threshold voltage variation $\sigma_c$ is width-independent. However, the uncorrelated threshold voltage $\sigma_u$ and the total threshold voltage variation $\sigma_T$ are width-dependent and, thereby dependent on the number of channel regions, as appropriate, in the selected FETs. FIG. 5 is a flow diagram illustrating techniques for finding the uncorrelated threshold voltage $\sigma_u$ at process 208 and the total threshold voltage variation $\sigma_T$ at process 210 for an arbitrary FET width w (i.e., for an arbitrary number of fingers or fins, as appropriate) in order to ultimately be able to determine the standard deviation of the correlated threshold voltage variation $\sigma_c$ at process 212.

Specifically, referring to FIG. 5, a decision can first be made regarding whether or not a common scaling relation (e.g., the scaling relation (14) above) is to be used for obtaining the standard deviation of the uncorrelated threshold voltage variation $\sigma_u(w)$ at other FET widths w (502).

If so, then $\sigma_u(w)$ can be obtained using that common scaling relation (504). Next, the standard deviation of the total threshold voltage variation $\sigma_T(w_0)$ for a FET of an arbitrary width $w_0$ can be measured (506). Once $\sigma_T(w_0)$ is determined, the standard deviation of the correlated threshold voltage variation $\sigma_c$ can be obtained using the following expression (508), $$\sigma_c = \sqrt{\sigma_T^2(w_0) - \sigma_u^2(w_0)}. \quad (20)$$

Finally, the standard deviation of the total threshold voltage $\sigma_T(w)$ for a FET of an arbitrary width w can be obtained using the following expression (510):

$$\sigma_T(w) = \sqrt{\sigma_c^2 + \sigma_u^2(w)}. \quad (21)$$

If the common scaling relation is not to be used to obtain the standard deviation of the uncorrelated threshold voltage variation $\sigma_u(w)$, the standard deviation of the total threshold voltage variation $\sigma_T(w_1)$ for a FET with a single finger (or single fin) of width w, which is equal to $w_1$, can be obtained through additional measurements (512). Next, the standard deviation of the correlated threshold voltage variation $\sigma_c$ can be obtained using expression (8) above. Next, standard deviations for the total threshold voltage variation (e.g., $\sigma_T(w_2)$, $\sigma_T(w_3)$, $\sigma_T(w_4)$, etc.) in multiple FETs with different FET widths (e.g., $w_2$, $w_3$, $w_4$, etc.) can be measured (516). Then, through interpolation and extrapolation $\sigma_T(w)$ at an arbitrary FET width w can be obtained (518). Finally, the standard deviation of the total threshold voltage $\sigma_T(w)$ for a FET of an arbitrary width w can be obtained using the following expression (520):

$$\sigma_u(w) = \sqrt{\sigma_T^2(w) - \sigma_c^2}. \qquad (22)$$

Referring again to FIG. 2, once the total threshold voltage variation $\sigma_T$, the standard deviation of the correlated threshold voltage variation $\sigma_c$ and the standard deviation of the uncorrelated threshold voltage variation $\sigma_u$ are obtained, the standard deviation of the uncorrelated threshold voltage variation $\sigma_u$ can be used to characterize the threshold voltage mismatch between a pair of adjacent essentially identical FETs on a chip (214).

Figure 6:
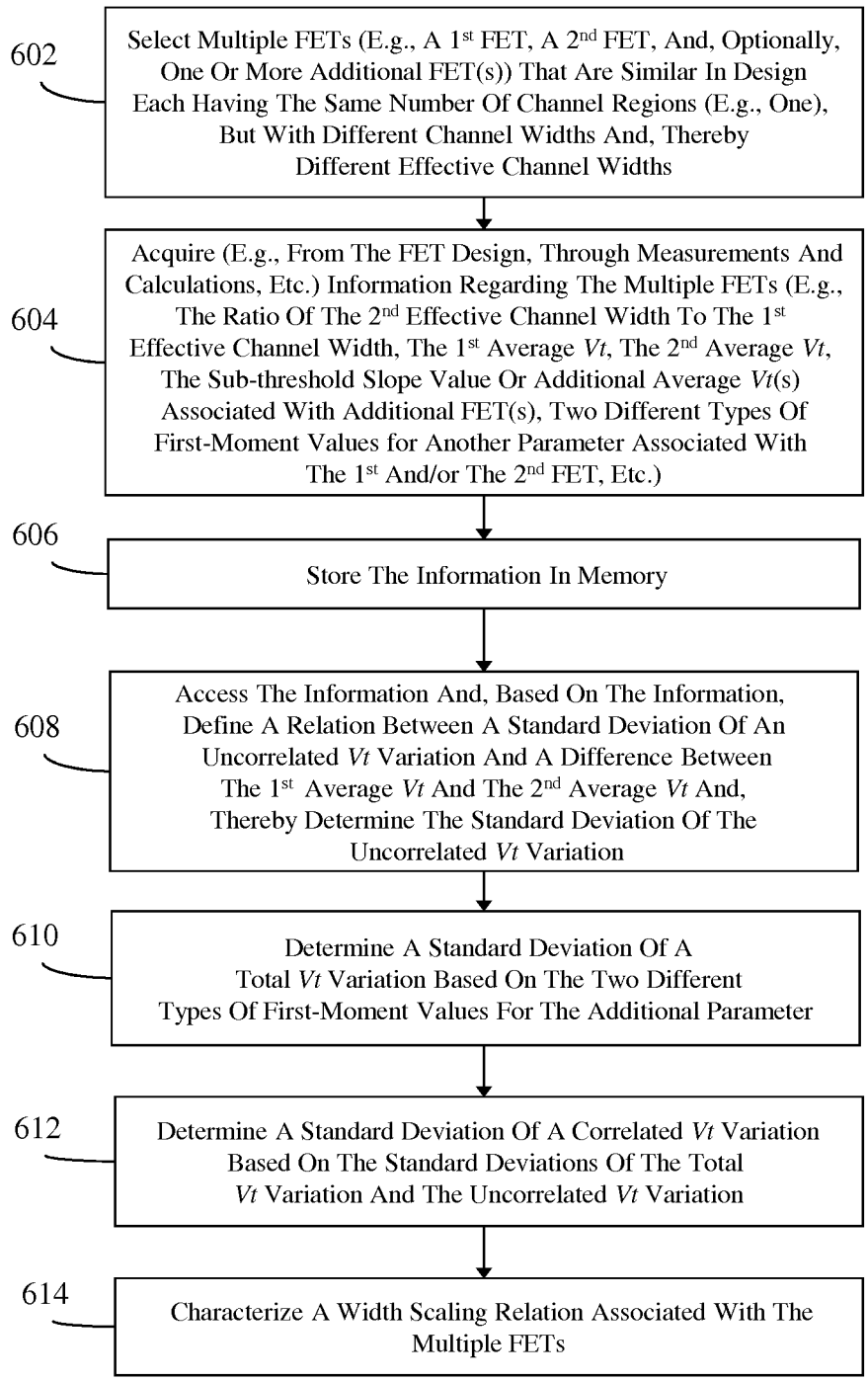
FIG. 6 is a flow diagram illustrating in greater detail another embodiment of the method of FIG. 1.

FIG. 6 is a flow diagram illustrating in greater detail another embodiment wherein the defined relation from process 108 of FIG. 1 may be used to characterize a width scaling relation associated with the multiple FETs.

More specifically, in the embodiment illustrated in the flow diagram of FIG. 6, multiple FETs having different effective channel widths can be selected for processing (602). The multiple FETs can be selected at process 602 such that they are all similar in design except for their different effective channel widths. For example, the multiple FETs can be selected at process 602 such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved by selecting FETs with the same number of channel regions (e.g., one) with different design widths.

Figure 7A:
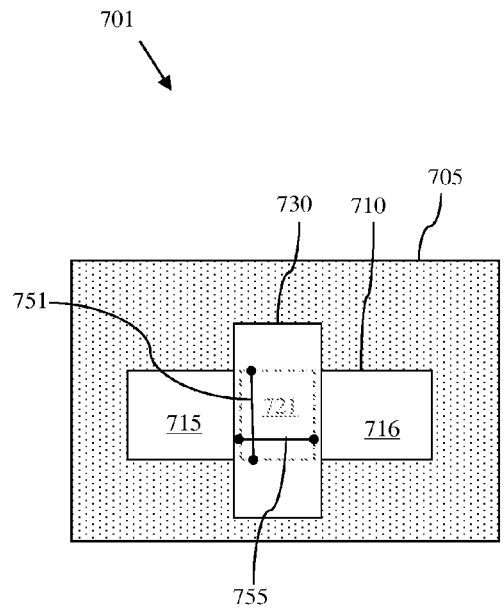
FIGS. 7A-7C are top view diagrams illustrating exemplary FETs that can be selected at process 602 of FIG. 6.
Figure 7B:
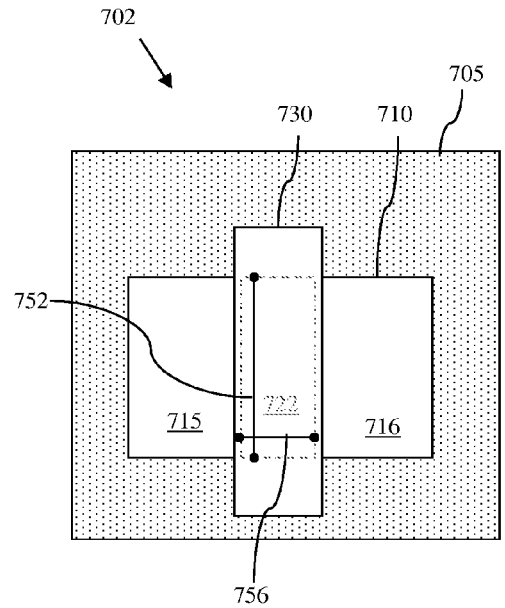
Figure 7C:
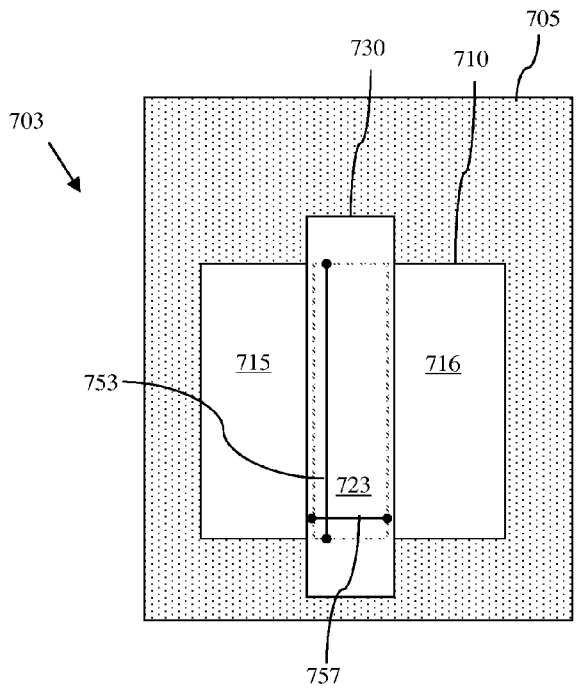

For example, at process 602, at least a first FET 701, as shown in FIG. 7A, a second FET 702, as shown in FIG. 7B, and, optionally, an additional FET 703, as shown in FIG. 7C, can be selected for processing. Each of these FETs 701-703 can comprise planar FETs, as illustrated. Alternatively, each of these FETS 701-703 can comprise non-planar FETs (not shown). In any case, each of these FETs can comprise a semiconductor body 710 (e.g., defined by a shallow trench isolation (STI) region 705 in a semiconductor layer in the case of a planar FET, as illustrated, or on the top surface of an isolation layer in the case of a non-planar FET (not shown)). The semiconductor body 710 can comprise a channel region positioned laterally between a source region 715 and a drain region 716 and a gate structure 730 can be positioned adjacent to the channel region. The first FET 701 can specifically comprise a first number of first channel region(s) 721 with a first channel length 755 and a first effective channel width 751. The second FET 702 can have a second number of second channel region(s) 721 with a second channel length 756 and a second effective channel width 752. The additional FET 703 can have an additional number of additional channel region(s) 723 with an additional channel length 757 and an additional effective channel width 753; and so on. The first number of first channel region(s) 721, the second number of channel region(s) 722 and the additional number of additional channel region(s) 723 can all be equal (e.g., one, as illustrated). The first channel length 755, the second channel length 756, and the additional channel length 757 can also all be equal. The first effective channel width 751, the second effective channel width 752 and the additional effective channel width 753 can all be different, but proportional.

For example, the second effective channel width 752 can be twice the first effective channel width 751, the additional effective channel width 753 can be n times (e.g., three times) the first effective channel width, and so on. In this case, the ratio of the second effective channel width to the first effective channel width (i.e., $w_2/w_1$) would be 2:1 and the ratio of the additional effective channel width to the first effective channel width (i.e., $w_n/w_1$) would be n:1. In this embodiment, $w_1$ can be the minimum effective FET width of a given FET type in a given semiconductor technology. See the detailed discussion above regarding expression (1) and the relationship between the effective channel widths and the corresponding design widths for the selected FETs.

After the FETs are selected at process 602, information associated with the selected FETs can be acquired (604) and stored in memory (606). This information can comprise the ratio of the second effective channel width $w_2$ to the first effective channel width $w_1$ (i.e., $w_2/w_1$) and, if applicable, the ratios of any additional effective channel widths to the first effective channel width $w_1$ (i.e., $w_n/w_1$, n=3, 4, 5, . . . ).

The information, which is acquired at process 604 and stored in memory at process 606, can further comprise the first average threshold voltage (i.e., $\langle V_{th,1} \rangle$) (e.g., a first mean threshold voltage) associated with the first FET 701, the second average threshold voltage (i.e. $\langle V_{th,2} \rangle$) (e.g., a second mean threshold voltage) associated with the second FET 702, and, if applicable, any additional average threshold voltages (i.e. $\langle V_{th,n} \rangle$, n=3, 4, 5, . . . ) associated with any additional FET 703. The first average threshold voltage $\langle V_{th,1} \rangle$ can be calculated from first threshold voltage measurements taken, during testing, from first field effect transistors on multiple test chips and, similarly, the second average threshold voltage $\langle V_{th,2} \rangle$ can calculated from second threshold voltage measurements taken, during the testing, from second field effect transistors on the multiple test chips. If applicable, the additional average threshold voltages (i.e., $\langle V_{th,n} \rangle$, n=3, 4, 5, . . . ) can be calculated from additional threshold voltage measurements taken, during testing, from additional field effect transistors on multiple test chips. That is, multiple instances of the first, second and any additional field effect transistors can be formed on multiple test chips and corresponding first, second and additional threshold voltage measurements can be taken, during testing, from the those field effect transistors. Then, an average (e.g., a mean) of the first threshold voltage measurements can be calculated to acquire the first average threshold voltage $\langle V_{th,1} \rangle$ associated with the first field effect transistor, an average (e.g., a mean) of the second threshold voltage measurements can be calculated to acquire the second average threshold voltage $\langle V_{th,2} \rangle$ associated with the second field effect transistor, and an average (e.g., a mean) of the additional threshold voltage measurements can be calculated to acquire the additional average threshold voltage(s) ( $\langle V_{th,n} \rangle$, n=3, 4, 5, . . . ).

The information, which is acquired at process 604 and stored in memory at process 606, can further comprise two different types of first-moment values (i.e., any two of average (also referred to herein as mean), median and mode values) of an additional electrical property (e.g., leakage current (i.e., $I_{off}$), also referred to herein as off current or drain-source current (i.e., $I_{tot}$)) of either the first FET and/or the second FET, as calculated based on leakage current $I_{off}$ measurements taken, during the testing, from the first field effect transistors and/or the second field effect transistors. The two different types of first-moment values can comprise, for example, a median value for the leakage current (i.e., $I_{off-median}$) and either a mean value for the leakage current ($I_{off-mean}$) or a mode value for the leakage current ($I_{off-mode}$). Those skilled in the art will recognize that, although the expressions (13) and (16) above can be applied in this case, the median value for leakage current $I_{off-median}$ will not necessarily be independent of both the standard deviation of the uncorrelated threshold voltage variation $\sigma_u$ and the standard deviation of the correlated threshold voltage variation $\sigma_c$.

With the multiple FETs configured in this manner and with the information acquired at process 604 and stored at process 606, as described above, the method can further comprise calculating the expression (13) or the expression (16) above, which define the relation between a standard deviation of an uncorrelated threshold voltage variation $\sigma_u$ and a difference between the first average threshold voltage $\langle V_{th,1} \rangle$ associated with the first FET and the second average threshold voltage $\langle V_{th,2} \rangle$ associated with the second FET (608). In this case, computing the expression (13) (or fitting expression (16)) comprises determining the standard deviation of the uncorrelated threshold voltage variation $\sigma_u$ based on a sub-threshold slope value (i.e., S), the difference between the first average threshold voltage $\langle V_{th,1} \rangle$ and the second average threshold voltage $\langle V_{th,2} \rangle$ and the ratio of the second effective channel width $w_2$ to the first effective channel width $w_1$ (i.e., $w_2/w_1$) and, if applicable, the ratio of any additional effective channel width $w_n$ to the first effective channel width (i.e., $w_n/w_1$).

It should be noted that the sub-threshold slope value S can be a calculated value based on measured leakage current values, which are part of the information acquired at process 604 and stored in memory at process 606. See detailed discussion above regarding expression (15). Alternatively, rather than calculating the sub-threshold slope value S based on measurements, as described above, the relation can be defined at process 608 by using a fitting process in conjunction with the expression (16) to simultaneously determine the sub-threshold slope value S and the standard deviation of the uncorrelated threshold voltage variation $\sigma_u$ using the first average threshold voltage $\langle V_{th,1} \rangle$, the second average threshold voltage $\langle V_{th,2} \rangle$, and at least one additional average threshold voltage(s) (i.e., $\langle V_{th,n} \rangle$, n=3, 4, 5, ...).

Additionally, the method can further comprise determining, by the processor and using the expressions (8), and (17)-(22) above, a standard deviation of a total threshold voltage variation ($\sigma_T$) associated with the multiple FETs, based on the two different types of first-moment values of the additional electrical property (610) and further determining, by the processor, the standard deviation of the correlated threshold voltage variation $\sigma_c$ associated with the multiple FETs, based on the total threshold voltage variation $\sigma_T$ and the standard deviation of the uncorrelated threshold voltage variation $\sigma_u$ (612). As discussed in detail above with regard to the embodiment illustrated in the flow diagram of FIG. 2, the standard deviation of the correlated threshold voltage variation $\sigma_c$ is width-independent; however, the uncorrelated threshold voltage $\sigma_u$ and the total threshold voltage variation $\sigma_T$ are width-dependent. Thus, the techniques shown in FIG. 5 can similarly be used for finding the uncorrelated threshold voltage $\sigma_u$ at process 608 and the total threshold voltage variation $\sigma_T$ at process 610 for an arbitrary FET width w in order to ultimately be able to determine the standard deviation of the correlated threshold voltage variation $\sigma_c$ at process 612. The total threshold voltage variation $\sigma_T$, the standard deviation of the correlated threshold voltage variation $\sigma_c$ and the standard deviation of the uncorrelated threshold voltage variation $\sigma_u$ can then be used in the characterization of the width scaling relation between multiple FETs and, particularly, between a FET with a relatively large channel width and one or more other FETs with proportionally smaller channel widths (614).

Figure 8:
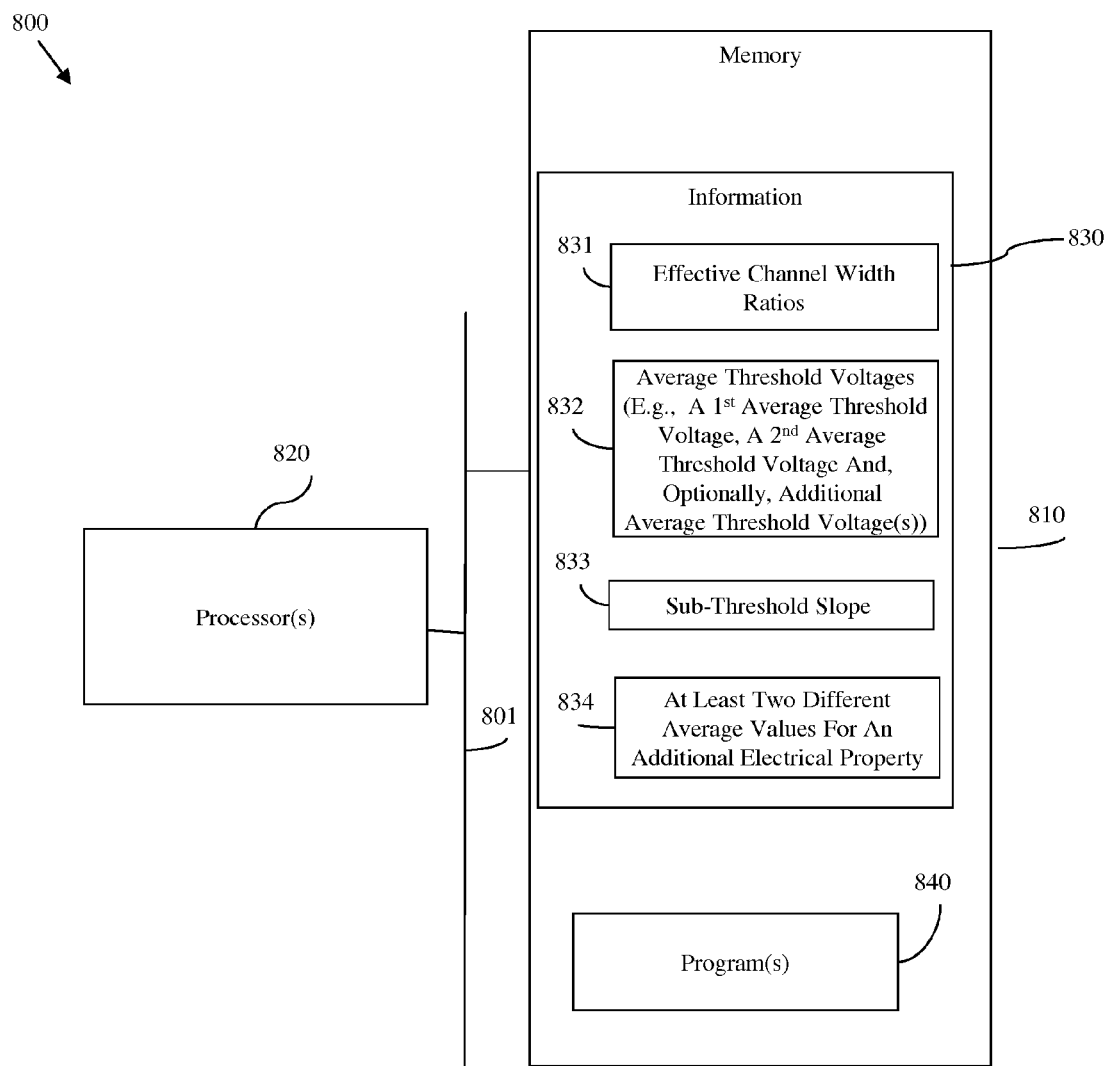
FIG. 8 is a schematic diagram illustrating a computer system for determining threshold voltage variations in field effect transistors (FETs); and, FIG. 9 is a schematic diagram illustrating an exemplary computer hardware environment for implementing the methods, system and computer program products disclosed herein.

Referring to FIG. 8, also disclosed herein is an associated computer system 800 for determining threshold voltage variations in field effect transistors (FETs). This system 800 can be implemented, for example, in a computer hardware environment such as that described in detail below and depicted in FIG. 9. Specifically, the computer system 800 can comprise a memory 810 and at least one processor 820 in communication with the memory 810 (e.g., over a system bus 801).

The memory 810 can store information 830 as well as one or more programs of instruction 840. The information 830 can be associated with multiple field effect transistors (FETs), which are selected (e.g., by a user) for processing by the computer system 800 and which have different effective channel widths. This information 830 can be acquired, for example, from the FET design layout and design specifications, through measurements and calculations, through simulations, through models, etc.

The multiple FETs can be selected such that they are all be similar in design except for their different effective channel widths. For example, the multiple FETs can be selected such that they all have the same type conductivity (i.e., N-type conductivity or P-type conductivity), such that they all have the same channel lengths, such that they all have the same gate dielectric thicknesses and such that they all have the same threshold voltage type (e.g., low threshold voltage, regular threshold voltage, high threshold voltage, etc). The different effective channel widths can be achieved either by selecting FETs with different numbers of channel regions where each channel region has the same design width or by selecting FETs with the same number of channel regions (e.g., one) with different design widths. In any case, the multiple FETs can comprise at least a first FET and a second FET. The first FET can have a first effective channel width $w_1$ and the second FET can have a second effective channel width $w_2$ that is greater than the first effective channel width $w_1$. The multiple FETs can, optionally, comprise additional FETs having additional effective channel widths that are different from the first effective channel width $w_1$ and the second effective channel width $w_2$. Specific requirements for the multiple FETs will be discussed in greater detail below with regard to the specific embodiments. The information 830 can comprise at least a ratio 831 of the second effective channel width $w_2$ of the second FET to the first effective channel width $w_1$ of the first FET.

The processor 820 can access the information 830 and can use it (i.e., can be adapted to use it, can be configured to use it, can execute a program 840 of instructions which use it, etc.) to solve the expression (13) or the expression (16), which are discussed in detail above with regard to the method and which define the relation between a standard deviation of an uncorrelated threshold voltage variation (i.e., $\sigma_u$) and a difference between a first average threshold voltage (i.e., $\langle V_{th,1} \rangle$) associated with the first FET and a second average threshold voltage (i.e., $\langle V_{th,2} \rangle$) associated with the second FET.

Depending upon the layouts of the multiple FETs selected (e.g., by a user) for processing by the computer system 800, the relation defined by the processor 820 in solving the expression (13) or the expression (16) can be used for different purposes.

In one embodiment, this defined relation can be used to determine the standard deviation of the uncorrelated threshold voltage variation $\sigma_u$ associated with the multiple FETs and this uncorrelated threshold voltage variation $\sigma_u$ can, in turn, be used to determine a standard deviation of a correlated threshold voltage variation (i.e., $\sigma_c$) associated with the multiple FETs. The standard deviation of the uncorrelated threshold voltage variation $\sigma_u$ can subsequently be used to characterize the threshold voltage mismatch between a pair of adjacent essentially identical FETs on a chip.

In this case, the multiple FETs can be selected so as to be similar in design, as described above, except for having different numbers of channel regions, each with the same design width and, thereby except for having different effective channel widths. Specifically, in this case, the multiple field effect transistors (FETs) selected for processing can comprise at least a first FET, having a first effective channel width $w_1$, and a second FET, having a second effective channel width $w_2$ that is greater than the first effective channel width $w_1$. Ideally, the first FET and the second FET will be selected such that the first average threshold voltage $\langle V_{th,1} \rangle$ associated with the first FET will be independent of both the standard deviation of the uncorrelated threshold voltage variation $\sigma_u$ and the standard deviation of the correlated threshold voltage variation $\sigma_c$ and such that the second average threshold voltage $\langle V_{th,2} \rangle$ associated with the second FET will be dependent on the standard deviation of the uncorrelated threshold voltage variation ($\sigma_u$), but independent of the standard deviation of the correlated threshold voltage variation ($\sigma_c$). To accomplish this, the multiple FETs can be selected such that the first FET comprises a first number $N_1$ of channel region(s) and, particularly, one channel region (i.e., $N_1=1$), having a specific channel width and a specific channel length, and such that the second FET comprises a second number $N_2$ of channel regions, each having the same specific channel width and the same specific channel length. That is, all but the first FET can comprise multi-finger FET(s) or multi-fin FET(s) having multiple channel regions with each channel region in each FET having the same specific channel width and the same specific channel length.

Thus, for example, the first FET can comprise a single-finger FET 301, such as that illustrated in FIG. 3A, or the single-fin FET 401, such as that illustrated in FIG. 4A, and the second FET can comprise, as appropriate, a multi-finger FET 302 or 303, as illustrated in FIG. 3B or 3C, or a multi-fin FET 402 or 403, as illustrated in FIG. 4B or 4C. Any additional FET can comprise the multi-finger FET 303, as illustrated in FIG. 3C, or the multi-fin FET 403, as illustrated in FIG. 4C, with a greater number of fingers or fins, as applicable, than in the second FET.

As mentioned above, the channel regions in the multiple FETs shall have the same specific channel width and the same specific channel length. Thus, as illustrated in FIGS. 3A-3C the channel region 320 of the single-finger FET 301, the two channel regions $320_1$-$320_2$ of the multi-finger FET 302 and the n channel regions $320_1$-$320_n$ of the multi-finger FET 303 all have the same channel width 350 and channel length 355. Similarly, as illustrated in FIGS. 4A-4C the channel region 420 of the single-fin FET 401, the two channel regions $420_1$-$420_2$ of the multi-fin FET 402 and the n channel regions $420_1$-$420_n$ of the multi-fin FET 403 all have the same channel width 450 and channel length 455.

In this case, the information 830, which is acquired and stored in memory 810, can comprise various effective channel width ratios 831 including, but not limited to, can comprise the ratio of the second effective channel width $w_2$ to the first effective channel width $w_1$, where the ratio is equal to the second number $N_2$ of channel regions in the second FET to the first number $N_1$ of channel regions in the first FET. As mentioned above, the first number $N_1$ should be equal to one so that the first average threshold voltage $\langle V_{th,1} \rangle$ of the first FET is independent of both the standard deviation of the uncorrelated threshold voltage variation $\sigma_u$ and the standard deviation of the correlated threshold voltage variation $\sigma_c$, whereas the second number $N_2$ should be a positive integer that is greater than the one so that the second average threshold voltage $\langle V_{th,2} \rangle$ of the second FET will be dependent on the standard deviation of the uncorrelated threshold voltage variation $\sigma_u$, but independent of the standard deviation of the correlated threshold voltage variation $\sigma_c$.

The information 830, which is acquired and stored in memory 810, can further comprise various average threshold voltages 832 including, but not limited to, the first average threshold voltage $\langle V_{th,1} \rangle$ associated with the first FET (e.g., a first mean threshold voltage) and the second average threshold voltage $\langle V_{th,2} \rangle$ associated with the second FET (e.g., a second mean threshold voltage). The first average threshold voltage $\langle V_{th,1} \rangle$ can be calculated from first threshold voltage measurements taken, during testing, from first field effect transistors on multiple test chips and, similarly, the second average threshold voltage $\langle V_{th,2} \rangle$ can calculated from second threshold voltage measurements taken, during the testing, from second field effect transistors on the multiple test chips. That is, multiple instances of the first and second field effect transistors can be formed on multiple test chips and first and second threshold voltage measurements can be taken, during testing, from the first and second field effect transistors. Then, an average (also referred to herein as a mean) of the first threshold voltage measurements can be calculated to acquire the first average threshold voltage $\langle V_{th,1} \rangle$ associated with the first FET and an average (also referred to herein as a mean) of the second threshold voltage measurements can be calculated to acquire the second average threshold voltage $\langle V_{th,2} \rangle$ associated with the second FET.

The information 830, which is acquired and stored in memory 810, can further comprise two different types of first-moment values 834 (e.g., any two of average (also referred to herein as mean), median, and mode values) of an additional electrical property (e.g., leakage current (i.e., $I_{off}$), also referred to herein as off current or drain-source current (i.e., $I_{tot}$)) of either the first FET and/or the second FET, as calculated based on leakage current $I_{off}$ measurements taken, during the testing, from the first field effect transistors and/or the second field effect transistors. The two different types of first-moment values 834 can comprise, for example, a median value for the leakage current (i.e., $I_{off\text{-}median}$), which is independent of both the standard deviation of the uncorrelated threshold voltage variation $\sigma_u$ and the standard deviation of the correlated threshold voltage variation $\sigma_c$, and either a mean value for the leakage current (i.e., $I_{off\text{-}mean}$) or a mode value for the leakage current (i.e., $I_{off\text{-}mode}$), which is dependent upon the total threshold voltage variation $\sigma_T$ and, thereby dependent upon both the standard deviation of the uncorrelated threshold voltage variation $\sigma_u$ and the standard deviation of the correlated threshold voltage variation $\sigma_c$.

With the multiple FETs configured in this manner and with the information 830 discussed above acquired and stored in memory 810, the processor 820 can access the information 830 and can solve (i.e., can be adapted to solve, can be configured to solve, can execute a program 840 to solve, etc.) the expression (13) or the expression (16) above, which define the relation between a standard deviation of an uncorrelated threshold voltage variation $\sigma_u$ and a difference between the first average threshold voltage $\langle V_{th,1} \rangle$ associated with the first FET and a second average threshold voltage $\langle V_{th,2} \rangle$ associated with the second FET. In this case, calculating the expression (13) or the expression (16) comprises determining the standard deviation of the uncorrelated threshold voltage variation $\sigma_u$ based on a sub-threshold slope value (i.e., S), the difference between the first average threshold voltage $\langle V_{th,1} \rangle$ associated with the first FET and the second average threshold voltage $\langle V_{th,2} \rangle$ associated with the second FET and the ratio 831 of the second effective channel width $w_2$ of the second FET to the first effective channel width $w_1$ of the first FET (i.e., $w_2/w_1 = N_2/N_1$).

It should be noted that the sub-threshold slope value S can be a calculated value, which is part of the information 830 acquired and stored in memory 810 (see item number 833). Those skilled in the art will recognize that the sub-threshold slope value S characterizes the magnitude of the sub-threshold current, which is the diffusion current when the gate-source voltage (i.e., $V_{gs}$) is less than the threshold voltage, by measuring how much the difference between the gate voltage ($V_g$) and the source voltage ($V_s$) (also referred to herein as $V_{gs}$) has to be reduced for the drain current $I_{tot}$ to drop by a factor of 10 and this value can be calculated by solving the expression (15) above using current-voltage measurements taken, during said testing, from any the first field effect transistors and/or the second field effect transistors on the multiple test chips.

Alternatively, rather than calculating the sub-threshold slope value S based on measurements, as described above, the various average threshold voltages 832 in the information 830, which is acquired and stored in memory 810, can further comprise at least one additional average threshold voltage (i.e., $\langle V_{th,n} \rangle$) (e.g., at least one additional mean threshold voltage) associated with at least one additional FET. As mentioned above, any additional FET selected for processing can comprise the multi-finger FET 303, as illustrated in FIG. 3C, or the multi-fin FET 403, as illustrated in FIG. 4C, with a greater number of fingers or fins, as applicable, than in the second FET. Like the first average threshold voltage $\langle V_{th,1} \rangle$ associated with the first FET and the second average threshold voltage $\langle V_{th,2} \rangle$ associated with the second FET, the additional average threshold voltage(s) (i.e., $\langle V_{th,n} \rangle$) can be calculated based on additional threshold voltage measurements taken, during testing, from corresponding additional FETs on the multiple test chips. In this case, the processor 820 can perform a fitting process (i.e., can be adapted to perform a fitting process, can be configured to perform a fitting process, can execute a program 840 of instructions to perform a fitting process, etc.) in conjunction with the expression (13) or (16) to simultaneously determine the sub-threshold slope value S and the standard deviation of the uncorrelated threshold voltage variation $\sigma_u$ using the first average threshold voltage $\langle V_{th,1} \rangle$, the second average threshold voltage $\langle V_{th,2} \rangle$, and the additional average threshold voltages (i.e., $\langle V_{th,n} \rangle$, n=3, 4, 5, ...).

Additionally, the processor 820 can further determine (i.e., can be adapted to determine, be configured to determine, can execute a program 840 of instructions to determine, etc.) the following: a standard deviation of a total threshold voltage variation (i.e., $\sigma_T$) associated with the multiple FETs, based on the two different types of first-moment values of the additional electrical property; and the standard deviation of the correlated threshold voltage variation $\sigma_c$ associated with the multiple FETs, based on the total threshold voltage variation $\sigma_T$ and the standard deviation of the uncorrelated threshold voltage variation $\sigma_u$. As discussed in detail above with regard to the methods, the total threshold voltage variation $\sigma_T$ associated with the multiple FETs, the standard deviation of the uncorrelated threshold voltage variation $\sigma_u$ associated with the multiple FETs, and the standard deviation of the correlated threshold voltage variation $\sigma_c$ associated with the multiple FETs can be determined using the techniques set forth in the flow diagram of FIG. 5 and by solving the expressions (17)-(22). The standard deviation of the uncorrelated threshold voltage variation $\sigma_u$ can then be used by the processor 820 to characterize the threshold voltage mismatch between a pair of adjacent essentially identical FETs on a chip.

In another embodiment, the defined relation may be used to characterize a width scaling relation associated with the multiple FETs.

In this case, the multiple FETs can be selected so as to be similar in design, as described above, except for having the same number of channel regions (e.g., one each) with different design widths and, thereby except for having different effective channel widths. Specifically, in this case, the multiple FETs selected can comprise at least a first FET 701, as shown in FIG. 7A, a second FET 702, as shown in FIG. 7B, and, optionally, an additional FET 703, as shown in FIG. 7C, can be selected for processing. As discussed in greater detail above with regard to the method, each of these FETs 701-703 can comprise planar FETs, as illustrated, or alternatively, each of these FETS 701-703 can comprise non-planar FETs (not shown). In any case, the first FET 701 can specifically comprise a first number of first channel region(s) 721 with a first channel length 755 and a first effective channel width 751 (i.e., $w_1$). The second FET 702 can have a second number of second channel region(s) 721 with a second channel length 756 and a second effective channel width 752 (i.e., $w_2$). The additional FET 703 can have an additional number of additional channel region(s) 723 with an additional channel length 757 and an additional effective channel width 753 (i.e., $w_n$); and so on. The first number of first channel region(s) 721, the second number of channel region(s) 722 and the additional number of additional channel region(s) 723 can all be equal (e.g., one, as illustrated). The first channel length 755, the second channel length 756, and the additional channel length 757 can also all be equal. The first effective channel width $w_1$ 751, the second effective channel width $w_2$ 752 and the additional effective channel width $w_n$ 753 can all be different, but proportional. For example, the second effective channel width $w_2$ 752 can be twice the first effective channel width $w_1$ 751, the additional effective channel width $w_n$ 753 can be n times (e.g., three times) the first effective channel width, and so on. In this case, the ratio of the second effective channel width 1422 to the first effective channel width $w_1$ (i.e., $w_2/w_1$) would be 2:1 and the ratio of the additional effective channel width $w_n$ to the first effective channel width (i.e., $w_n/w_1$) would be n:1. See the detailed discussion above regarding expressions (1) and (2) and the relationship between the effective channel widths and the corresponding design widths for the selected FETs.

The information 830, which is acquired and stored in memory 810, can comprise various effective channel width ratios 831 including, but not limited to, the ratio of the second effective channel width to the first effective channel width (i.e., $w_2/w_1$) and, if applicable, the ratios of any additional effective channel widths to the first effective channel width (i.e., $w_n/w_1$, n=3, 4, 5, ...).

The information 830, which is acquired and stored in memory 810, can further comprise various average threshold voltages 832 including, but not limited to, the first average threshold voltage (i.e., $\langle V_{th,1} \rangle$) (e.g., a first mean threshold voltage) associated with the first FET 701, the second average threshold voltage (i.e., $\langle V_{th,2} \rangle$) (e.g., a second mean threshold voltage) associated with the second FET 702, and, if applicable, any additional average threshold voltage (i.e., $\langle V_{th,n} \rangle$) associated with any additional FET 703. The first average threshold voltage $\langle V_{th,1} \rangle$ can be calculated from first threshold voltage measurements taken, during testing, from first field effect transistors on multiple test chips and, similarly, the second average threshold voltage $\langle V_{th,2} \rangle$ can calculated from second threshold voltage measurements taken, during the testing, from second field effect transistors on the multiple test chips. If applicable, the additional average threshold voltage(s) (i.e., $\langle V_{th,n} \rangle$, n=3, 4, 5, . . .) can be calculated from additional threshold voltage measurements taken, during testing, from additional field effect transistors on multiple test chips. That is, multiple instances of the first, second and any additional field effect transistors can be formed on multiple test chips and corresponding first, second and additional threshold voltage measurements can be taken, during testing, from the those field effect transistors. Then, an average (also referred to herein as a mean) of the first threshold voltage measurements can be calculated to acquire the first average threshold voltage $\langle V_{th,1} \rangle$ associated with the first FET, an average (also referred to herein as a mean) of the second threshold voltage measurements can be calculated to acquire the second average threshold voltage $\langle V_{th,2} \rangle$ associated with the second FET, and an average (e.g., also referred to herein as a mean) of the additional threshold voltage measurements can be calculated to acquire the additional average threshold voltages (i.e., $\langle V_{th,n} \rangle$, n=3, 4, 5, . . .) associated with any additional FETs.

The information 830, which is acquired and stored in memory 810, can further comprise two different types of first-moment values 834 (i.e., any two of average (also referred to herein as a mean), median, and mode values) of an additional electrical property (e.g., leakage current (i.e., $I_{off}$), which is also referred to herein as off current or drain-source current (i.e., $I_{tot}$)) of either the first FET and/or the second FET, as calculated based on leakage current $I_{off}$ measurements taken, during the testing, from the first field effect transistors and/or the second field effect transistors. The two different types of first-moment values 834 can comprise a median value for the leakage current (i.e., $I_{off-median}$), which is independent of both the standard deviation of the uncorrelated threshold voltage variation $\sigma_u$ and the standard deviation of the correlated threshold voltage variation $\sigma_c$, and either a mean value for the leakage current (i.e., $I_{off-mean}$) or a mode value for the leakage current (i.e., $I_{off-mode}$), which is dependent upon the standard deviation of the total threshold voltage variation $\sigma_T$ and, thereby dependent upon both the standard deviation of the uncorrelated threshold voltage variation $\sigma_u$ and the standard deviation of the correlated threshold voltage variation $\sigma_c$).

With the multiple FETs configured in the manner described above and with the information 830 acquired and stored 810, the processor 820 can solve (i.e., can be adapted to solve, can be configured to solve, can execute a program 840 of instructions to solve, etc.) the expression (13) or the expression (16) above, which define the relation between the standard deviation of the uncorrelated threshold voltage variation $\sigma_u$ and the difference between the first average threshold voltage associated with the first FET and the second average threshold voltage $\langle V_{th,2} \rangle$ associated with the second FET. In this case, solving the expression (13) or (16) comprises determining the standard deviation of the uncorrelated threshold voltage variation $\sigma_u$ based on a sub-threshold slope value (i.e., S), the difference between the first average threshold voltage $\langle V_{th,1} \rangle$ and the second average threshold voltage $\langle V_{th,2} \rangle$, and the ratio of the second effective channel width $w_2$ to the first effective channel width $w_1$ (i.e., $w_2/w_1$) and, if applicable, the ratio of any additional effective channel width $w_n$ to the first effective channel width (i.e., $w_n/w_1$).

It should be noted that the sub-threshold slope value S can be a calculated value, which is part of the information acquired and stored in memory 810. Those skilled in the art will recognize that the sub-threshold slope value S characterizes the magnitude of the sub-threshold current, which is the diffusion current when the gate-source voltage (i.e., $V_{gs}$) is less than the threshold voltage, by measuring how much the difference between the gate voltage ($V_g$) and the source voltage ($V_s$) (also referred to herein as $V_{gs}$) has to be reduced for the drain current (i.e., $I_{tot}$) to drop by a factor of 10 and this value can be calculated by solving the expression (15) above using current-voltage measurements taken, during said testing, from any the first field effect transistors and/or the second field effect transistors on the multiple test chips. Alternatively, rather than calculating the sub-threshold slope value S based on measurements, as described above, the processor 820 can perform a fitting process (i.e., can be adapted to perform a fitting process, can be configured to perform a fitting process, can execute a program 840 of instructions to perform a fitting process, etc.) in conjunction with the expression (16) to simultaneously determine the sub-threshold slope value S and the standard deviation of the uncorrelated threshold voltage variation $\sigma_u$ using the first average threshold voltage $\langle V_{th,1} \rangle$, the second average threshold voltage ($\langle V_{th,2} \rangle$), and any additional average threshold voltages (i.e., $\langle V_{th,1} \rangle$, n=3, 4, 5, . . . ).

Additionally, the processor 820 can further determine (i.e., can be adapted to determine, be configured to determine, can execute a program 840 of instructions to determine, etc.) the following: a total threshold voltage variation $\sigma_T$ associated with the multiple FETs, based on the two different types of first-moment values of the additional electrical property; and a standard deviation of a correlated threshold voltage variation $\sigma_c$ associated with the multiple FETs, based on the standard deviation of the total threshold voltage variation $\sigma_T$ and the standard deviation of the uncorrelated threshold voltage variation $\Gamma_u$. As discussed in detail above with regard to the methods, the standard deviation of the total threshold voltage variation $\sigma_T$ associated with the multiple FETs, the standard deviation of the uncorrelated threshold voltage variation $\sigma_u$ associated with the multiple FETs, and the standard deviation of the correlated threshold voltage variation 6, associated with the multiple FETs can be determined using the techniques set forth in the flow diagram of FIG. 5 and by solving the expressions (17)-(22). The standard deviation of the total threshold voltage variation $\sigma_T$, the standard deviation of the correlated threshold voltage variation $\sigma_c$ and the standard deviation of the uncorrelated threshold voltage variation $\sigma_u$ can then be used by the processor 820 to characterize the width scaling relation (i.e., threshold voltage changes as a function of channel width changes) between multiple FETs and, particularly, between a FET with a relatively large channel width and one or more other FETs with proportionally smaller channel widths.

Also disclosed herein is a computer program product. The computer program product can comprise a computer readable storage medium having program instructions embodied therewith (i.e., stored thereon). The program instructions can be executable by a processor to cause the processor to perform the above-described method.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
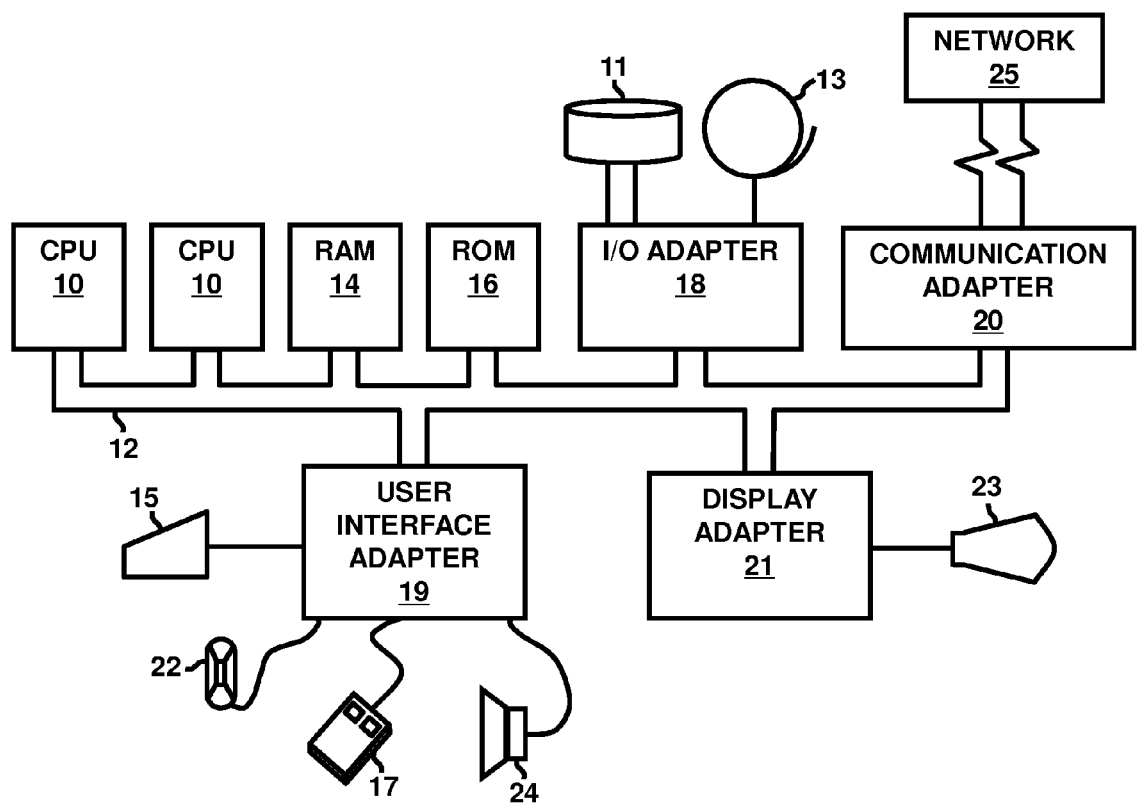

A representative hardware environment (i.e., a computer system) for implementing the methods, systems and computer program products discussed in detail above is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed [systems, methods and computer program products] and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above is a computer-implemented method for determining threshold voltage variations in field effect transistors (FETs). In the method, multiple field effect transistors (FETs) (e.g., at least a first FET and a second FET), which are similar in design except for having different effective channel widths, can be selected for processing. Information regarding these multiple FETs (e.g., the ratio of the different effective channel widths and other information) can be acquired and used to define the relation between a standard deviation of an uncorrelated threshold voltage variation associated with the multiple FETs and a difference between a first average threshold voltage associated with the first FET and a second average threshold voltage associated with the second FET. This defined relation can, depending upon the layouts of the multiple FETs, be used for different purposes (e.g., for characterizing the threshold voltage mismatch between a pair of adjacent essentially identical FETs on a chip or for characterizing a width scaling relation). Also disclosed above are an associated computer system and a computer program product for determining threshold voltage variations in FETs.

What is claimed is:

1. A method comprising:
testing multiple test chips and, during said testing, taking measurements from multiple field effect transistors on said multiple test chips, said multiple field effect transistor having different channel widths;
accessing, by a processor from a memory, information regarding said multiple field effect transistors having said different effective channel widths,
said field effect transistors comprising at least a first field effect transistor having a first effective channel width $w_1$ and a second field effect transistor having a second effective channel width $w_2$ that is greater than said first effective channel width $w_1$,
said information being acquired at least in part from said measurements and said information comprising at least a first average threshold voltage associated with said first field effect transistor, a second average threshold voltage associated with said second field effect transistor, and a ratio of said second effective channel width $w_2$ to said first effective channel width $w_1$; and,
defining, by said processor and based on said information, a relation between a standard deviation of an uncorrelated threshold voltage variation associated with said multiple field effect transistors and a difference between said first average threshold voltage associated with said first field effect transistor and said second average threshold voltage associated with said second field effect transistor, said defining of said relation comprising determining said standard deviation of said uncorrelated threshold voltage variation based on a sub-threshold slope value, on said difference between said first average threshold voltage and said second average threshold voltage, and on said ratio of said second effective channel width $w_2$ to said first effective channel width $w_1$.

2. The method of claim 1,
said first field effect transistor comprising a first number $N_1$ of channel regions, said first number $N_1$ being one,
said second field effect transistor comprising a second number $N_2$ of channel regions,
said second number $N_2$ being a positive integer greater than one, and
said channel regions in said first field effect transistor and said second field effect transistor each having a same specific channel width.

3. The method of claim 2,
said first average threshold voltage being calculated from first threshold voltage measurements taken, during said testing, from first field effect transistors on said multiple test chips, and
said second average threshold voltage being calculated from second threshold voltage measurements taken, during said testing, from second field effect transistors on said multiple test chips.

4. The method of claim 3, further comprising characterizing threshold voltage mismatch between a pair of adjacent field effect transistors on a chip using said standard deviation of said uncorrelated threshold voltage variation.

5. The method of claim 3, said information further comprising said sub-threshold slope value as calculated from current-voltage measurements taken, during said testing, from any one of said first field effect transistors and said second field effect transistors on said multiple test chips.

6. The method of claim 3, said information further comprising at least one additional average threshold voltage associated with at least one additional field effect transistor and said defining of said relation comprising simultaneously determining said sub-threshold slope value and said standard deviation of said uncorrelated threshold voltage variation using said first average threshold voltage, said second average threshold voltage, and said at least one additional average threshold voltage.

7. The method of claim 3, said information further comprising two different types of first-moment values of an additional electrical property of any one of said first field effect transistor and said second field effect transistor and said method further comprising:
- determining, by said processor, a standard deviation of a total threshold voltage variation based on said two different types of first-moment values of said additional electrical property; and,
- determining, by said processor, a standard deviation of a correlated threshold voltage variation based on said standard deviation of said total threshold voltage variation and said standard deviation of said uncorrelated threshold voltage variation.

8. A method comprising:
- testing multiple test chips and, during said testing, taking measurements from multiple field effect transistors on said multiple test chips, said multiple field effect transistor having different channel widths;
- accessing, by a processor from a memory, information regarding said multiple field effect transistors having said different effective channel widths,
  - said field effect transistors comprising at least a first field effect transistor having a first channel region with a first effective channel width $w_1$ and a second field effect transistor having a second channel region with a second effective channel width $w_2$ that is greater than said first effective channel width $w_1$, and
  - said information being acquired at least in part from said measurements and said information comprising at least a first average threshold voltage associated with said first field effect transistor, a second average threshold voltage associated with said second field effect transistor, and a ratio of said second effective channel width $w_2$ to said first effective channel width $w_1$; and,
- defining, by said processor and based on said information, a relation between a standard deviation of an uncorrelated threshold voltage variation associated with said multiple field effect transistors and a difference between said first average threshold voltage associated with said first field effect transistor and said second average threshold voltage associated with said second field effect transistor, said relation being used to characterize a width scaling relation between said multiple field effect transistors, said defining of said relation comprising determining said standard deviation of said uncorrelated threshold voltage variation based on a sub-threshold slope value, on said difference between said first average threshold voltage and said second average threshold voltage, and on said ratio of said second effective channel width $w_2$ to said first effective channel width $w_1$.

9. The method of claim 8,
- said first average threshold voltage being calculated from first threshold voltage measurements taken, during said testing, from first field effect transistors on said multiple test chips, and
- said second average threshold voltage being calculated from second threshold voltage measurements taken, during said testing, from second field effect transistors on said multiple test chips.

10. The method of claim 9, said information further comprising said sub-threshold slope value as calculated from current-voltage measurements taken, during said testing, from any one of said first field effect transistors and said second field effect transistors on said multiple test chips.

11. The method of claim 9, said information further comprising at least one additional average threshold voltage associated with at least one additional field effect transistor and said defining of said relation comprising simultaneously determining said sub-threshold slope value and said standard deviation of said uncorrelated threshold voltage variation using said first average threshold voltage, said second average threshold voltage, and said at least one additional average threshold voltage.

12. A system comprising:
- a memory storing information regarding multiple field effect transistors having different effective channel widths,
  - said field effect transistors comprising at least a first field effect transistor having a first effective channel width $w_1$ and a second field effect transistor having a second effective channel width $w_2$ that is greater than said first effective channel width $w_1$, and
  - said information being acquired at least in part from measurements taken during testing of said multiple field effect transistors on multiple test chips and said information comprising at least a first average threshold voltage associated with said first field effect transistor, a second average threshold voltage associated with said second field effect transistor, and a ratio of said second effective channel width $w_2$ to said first effective channel width $w_1$; and,
- a processor in communication with said memory, said processor accessing said information and defining, based on said information, a relation between a standard deviation of an uncorrelated threshold voltage variation associated with said multiple field effect transistors and a difference between said first average threshold voltage associated with said first field effect transistor and said second average threshold voltage of said second field effect transistor,
- said processor defining said relation by determining said standard deviation of said uncorrelated threshold voltage variation based on a sub-threshold slope value, on said difference between said first average threshold voltage and said second average threshold voltage, and on said ratio of said second effective channel width $w_2$ to said first effective channel width $w_1$.

13. The system of claim 12,
- said first field effect transistor comprising a first number $N_1$ of channel regions, said first number $N_1$ being one,
- said second field effect transistor comprising a second number $N_2$ of channel regions, said second number $N_2$ being a positive integer greater than one, and
- said channel regions in said first field effect transistor and said second field effect transistor each having a same specific channel width.

14. The system of claim 12,
- said first average threshold voltage being calculated from first threshold voltage measurements taken, during said testing, from first field effect transistors on said multiple test chips, and said second average threshold voltage being calculated from second threshold voltage measurements taken, during said testing, from second field effect transistors on said multiple test chips.

15. The system of claim 14, said processor further characterizing threshold voltage mismatch between a pair of adjacent field effect transistors on a chip using said standard deviation of said uncorrelated threshold voltage variation.

16. The system of claim 14, said information further comprising said sub-threshold slope value as calculated from current-voltage measurements taken, during said testing, from any one of said first field effect transistors and said second field effect transistors on said multiple test chips.

17. The system of claim 14, said information further comprising at least one additional average threshold voltage associated with at least one additional field effect transistor and said processor defining said relation by simultaneously determining said sub-threshold slope value and said standard deviation of said uncorrelated threshold voltage variation using said first average threshold voltage, said second average threshold voltage, and said at least one additional average threshold voltage.

18. The system of claim 14, said information further comprising two different types of first-moment values of an additional electrical property of any one of said first field effect transistor and said second field effect transistor and said processor further performing the following:
   determining a standard deviation of a total threshold voltage variation based on said two different types of first-moment values of said additional electrical property; and,
   determining a standard deviation of a correlated threshold voltage variation based on said standard deviation of said total threshold voltage variation and said standard deviation of said uncorrelated threshold voltage variation.

19. A system comprising:
   a memory storing information regarding multiple field effect transistors having different effective channel widths,
      said field effect transistors comprising at least a first field effect transistor having a first channel region with a first effective channel width $w_1$ and a second field effect transistor having a second channel region with a second effective channel width $w_2$ that is greater than said first effective channel width $w_1$, and
      said information being acquired at least in part from measurements taken during testing of said multiple field effect transistors on multiple test chips and said information comprising at least a first average threshold voltage associated with said first field effect transistor, a second average threshold voltage associated with said second field effect transistor, and a ratio of said second effective channel width $w_2$ to said first effective channel width $w_1$; and,
   a processor in communication with said memory, said processor accessing said information and defining, based on said information, a relation between a standard deviation of an uncorrelated threshold voltage variation associated with said multiple field effect transistors and a difference between said first average threshold voltage associated with said first field effect transistor and said second average threshold voltage associated with said second field effect transistor, said relation describing a width scaling relation between said multiple field effect transistors,
   said processor defining said relation by determining said standard deviation of said uncorrelated threshold voltage variation based on a sub-threshold slope value, on said difference between said first average threshold voltage and said second average threshold voltage, and on said ratio of said second effective channel width $w_2$ to said first effective channel width $w_1$.

20. The system of claim 19,
   said first average threshold voltage being calculated from first threshold voltage measurements taken, during said testing, from first field effect transistors on said multiple test chips, and
   said second average threshold voltage being calculated from second threshold voltage measurements taken, during said testing, from second field effect transistors on said multiple test chips.

* * * * *